(12) United States Patent  
Azuma

(10) Patent No.: US 9,258,473 B2  
(45) Date of Patent: Feb. 9, 2016

(54) CAMERA ORIENTATION SENSING USING CAMERA MODULE WITH MEMS AF ACTUATOR

(71) Applicant: DigitalOptics Corporation, San Jose, CA (US)

(72) Inventor: Eddie Azuma, San Jose, CA (US)

(73) Assignee: DigitalOptics Corporation, San Jose, CA (US)

( * ) Notice: Subject to any disclaimer, the term of this patent is extended or adjusted under 35 U.S.C. 154(b) by 35 days.

(21) Appl. No.: 13/931,975

(22) Filed: Jun. 30, 2013

(65) Prior Publication Data

US 2014/0028887 A1     Jan. 30, 2014

Related U.S. Application Data

(60) Provisional application No. 61/675,812, filed on Jul. 25, 2012, provisional application No. 61/698,567, filed on Sep. 8, 2012.

(51) Int. Cl.
| | |
|---|---|
| *H04N 5/232* | (2006.01) |
| *H04N 5/225* | (2006.01) |
| *G03B 13/36* | (2006.01) |
| *G03B 3/10* | (2006.01) |
| *G03B 5/00* | (2006.01) |
| *H04N 17/00* | (2006.01) |

(52) U.S. Cl.
CPC .................. *H04N 5/232* (2013.01); *G03B 3/10* (2013.01); *G03B 5/00* (2013.01); *G03B 13/36* (2013.01); *H04N 5/2257* (2013.01); *H04N 5/23212* (2013.01); *H04N 17/002* (2013.01); *G03B 2205/0046* (2013.01); *G03B 2205/0061* (2013.01)

(58) Field of Classification Search
CPC . H04N 5/232; H04N 5/2257; H04N 5/23212; H04N 17/002; G03B 3/10; G03B 5/00; G03B 13/36; G03B 2205/0046; G03B 2205/0061

See application file for complete search history.

(56) References Cited

U.S. PATENT DOCUMENTS

| | | | |
|---|---|---|---|
| 2006/0204242 A1* | 9/2006 | Gutierrez et al. | 396/439 |
| 2008/0198249 A1* | 8/2008 | Tanimura et al. | 348/294 |
| 2009/0027510 A1* | 1/2009 | Yumiki | 348/222.1 |
| 2009/0174953 A1* | 7/2009 | Chang | 359/814 |
| 2011/0013895 A1* | 1/2011 | Chiang | 396/55 |
| 2011/0052164 A1* | 3/2011 | Huang et al. | 396/55 |
| 2011/0136283 A1* | 6/2011 | Gritters et al. | 438/50 |
| 2011/0150442 A1* | 6/2011 | Ollila et al. | 396/55 |
| 2011/0317291 A1* | 12/2011 | Lee | 359/823 |
| 2013/0338834 A1* | 12/2013 | Martinez et al. | 700/275 |

* cited by examiner

*Primary Examiner* — Jason Flohre  
(74) *Attorney, Agent, or Firm* — Haynes and Boone, LLP

(57) ABSTRACT

A camera module includes an actuator coupled to one or more movable lenses of an optical train and configured to move the one or more lenses relative to the image sensor to provide zoom or autofocus or both to the camera module. The actuator is configured to bias one or more pairs of actuator components, and to measure one or more capacitances of the one or more pairs of actuator components, and to determine an orientation of the camera module based on the one or more measured capacitances, and to provide information accordingly for the actuator to step through an auto-focus process that is specifically tailored to one of multiple sub-ranges of camera pointing angles.

20 Claims, 26 Drawing Sheets

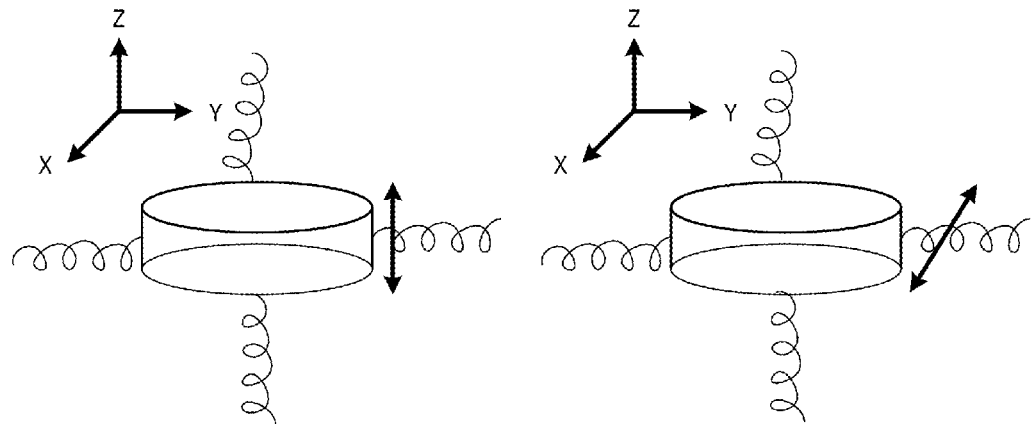
Figure 19A　　　　Figure 19B
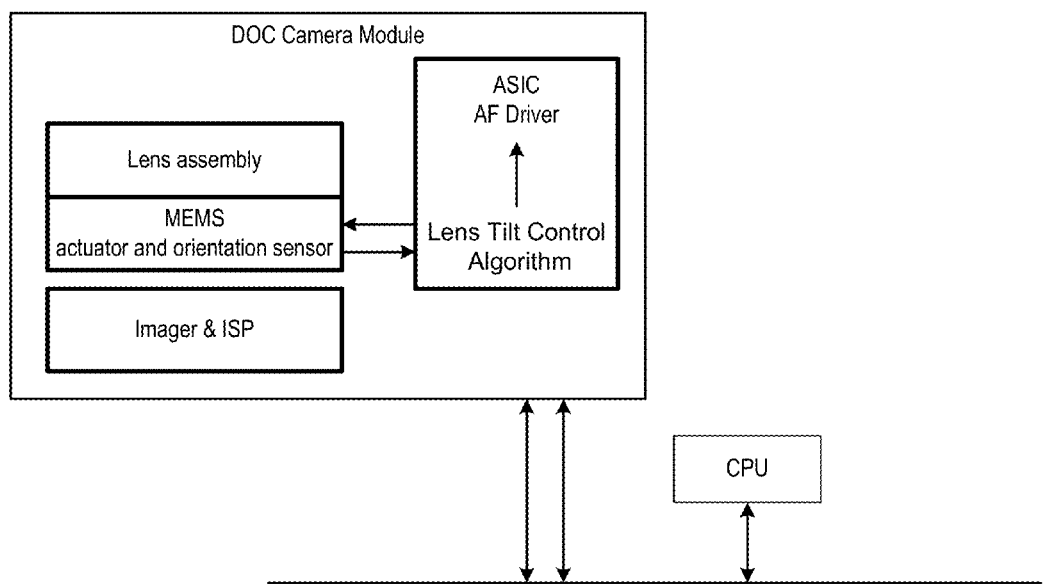
Figure 20

Bending the FPC and glued by UV glue

CAMERA ORIENTATION SENSING USING CAMERA MODULE WITH MEMS AF ACTUATOR

CROSS-REFERENCE TO RELATED APPLICATIONS

This application is a non-provisional and claims the benefit of priority under 35 U.S.C. §119(e) to U.S. provisional patent applications Nos. 61/675,812, filed Jul. 25, 2012, and 61/698, 567, filed Sep. 8, 2012.

This application is related to a pair of contemporaneously-filed patent applications by the same Applicant and Inventor, U.S. patent application Ser. No. 13/931,973, filed Jun. 30, 2013 and entitled CAMERA MODULE WITH ORIENTATION SENSING, and U.S. patent application Ser. No. 13/931,978, filed Jun. 30, 2013 and entitled CAMERA ORIENTATION SENSING USING CAMERA MODULE PROCESSOR. This application is also related to U.S. patent application Ser. No. 13/840,576, filed Mar. 15, 2013, which claims priority to U.S. provisional patent application No. 61/622, 480, filed Apr. 10, 2012, which are hereby incorporated by reference.

BACKGROUND

The invention relates to camera modules, and particularly to a camera module having a MEMS (microelectrical mechanical system) actuator configured to move one or more focusing lenses, and particularly including auto-focus (AF) and/or zoom features and an orientation sensor that utilizes pre-existing data from the MEMS actuator.

BRIEF DESCRIPTIONS OF THE DRAWINGS

FIG. 1 schematically illustrates, in plan view, an example embodiment of an in-plane actuator device in accordance with certain embodiments.

FIG. 2 schematically illustrates, in partial plan view, an actuator of the example actuator device of FIG. 1, showing the actuator in an as-fabricated state and before being deployed for operational use.

FIG. 3 schematically illustrates, in partial plan view, the actuator of FIG. 2, showing the actuator after deployment for operational use.

FIG. 4 schematically illustrates, in partial plan view, an actuator device in an example method for deploying the actuator device in accordance with certain embodiments.

FIG. 5 schematically illustrates, in front end plan view, an example embodiment of an actuator device in accordance with certain embodiments.

FIG. 6 schematically illustrates, in partial perspective view, the example actuator of FIG. 5.

FIGS. 7A, 7B and 7C schematically illustrate, in partial cross-sectional views, the actuator device of FIG. 5 taken along the lines of the section 28-28 illustrating examples of a device in accordance with certain embodiments in as-fabricated state, deployed state and deployed and actuated state.

FIGS. 8A and 8B schematically illustrate, in partial cross-sectional views, a deployment foot in accordance with certain embodiments of an example actuator device respectively illustrating the deployment foot before deployment and adhesively fixed in place after deployment.

FIG. 9 schematically illustrates a portion of a platform for an actuator device in accordance with certain embodiments.

FIG. 10 schematically illustrates a bottom view of a movable lens positioned for mounting to the an actuator device in accordance with certain embodiments FIG. 11 schematically illustrates a side view of the movable lens mounted to the actuator device of FIG. 10.

FIG. 12 schematically illustrates portion of an actuator device in accordance with certain embodiments.

FIG. 13 schematically illustrates a bottom view of the actuator device of FIG. 12 in a deployed state.

FIG. 14 schematically illustrates a portion of the actuator device of FIG. 13 in a deployed configuration without any bias voltage applied thereto.

FIG. 15 schematically illustrates a portion of the actuator device of FIG. 13 in a deployed configuration with a small bias voltage applied thereto.

FIG. 16 schematically illustrates a portion of the actuator device of FIG. 13 in a deployed configuration with a large bias voltage applied thereto.

FIG. 17 schematically illustrates a lateral snubber assembly in accordance with certain embodiments.

FIG. 18 includes three plots of capacitance versus bias voltage including neutral gravity (solid), positive gravity (+g, dotted line), and negative gravity (−g, dashed line).

FIG. 19A illustrates a lens being vibrated about the z-axis (parallel to the optical path) to generate an inertial frame to achieve a gyroscopic function in accordance with certain embodiments.

FIG. 19B illustrates a lens being vibrated about the x-axis or y-axis (orthogonal to the optical path) to generate an inertial frame to achieve a gyroscopic function in accordance with certain embodiments.

FIG. 20 illustrates schematically a camera module that utilizes actuator voltage inputs and capacitance measurements to determine orientation.

Figure 22:
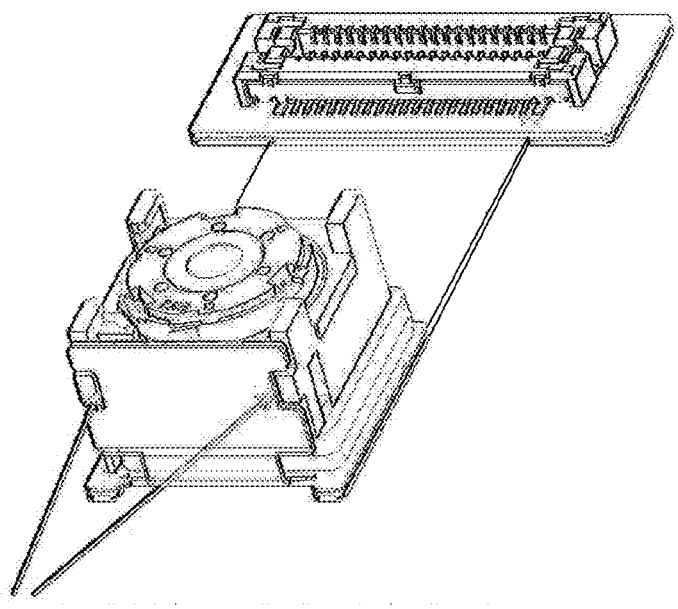

FIG. 22 schematically illustrates a perspective view of an example camera module coupled to a flexible printed circuit (FPC) in accordance with certain embodiments.

Figure 23:
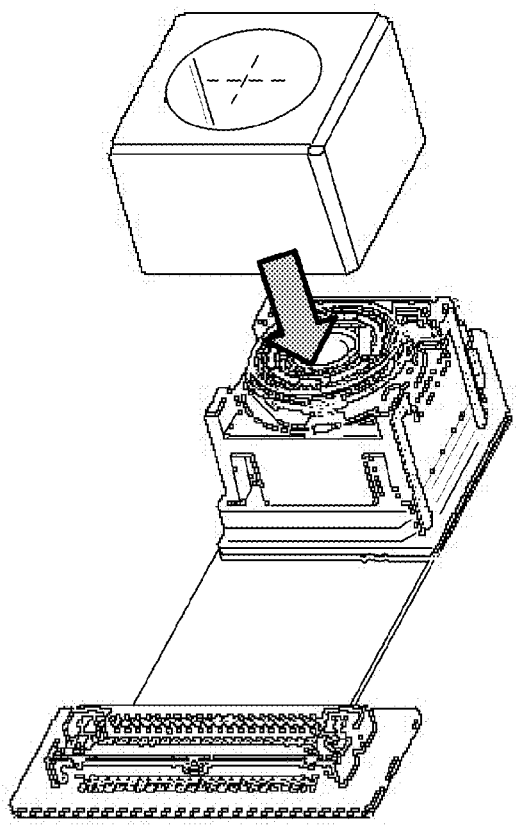

FIG. 23 schematically illustrates, in exploded view, an EMI shield for covering an assembled version of a camera module in accordance with certain embodiments.

Figure 24:
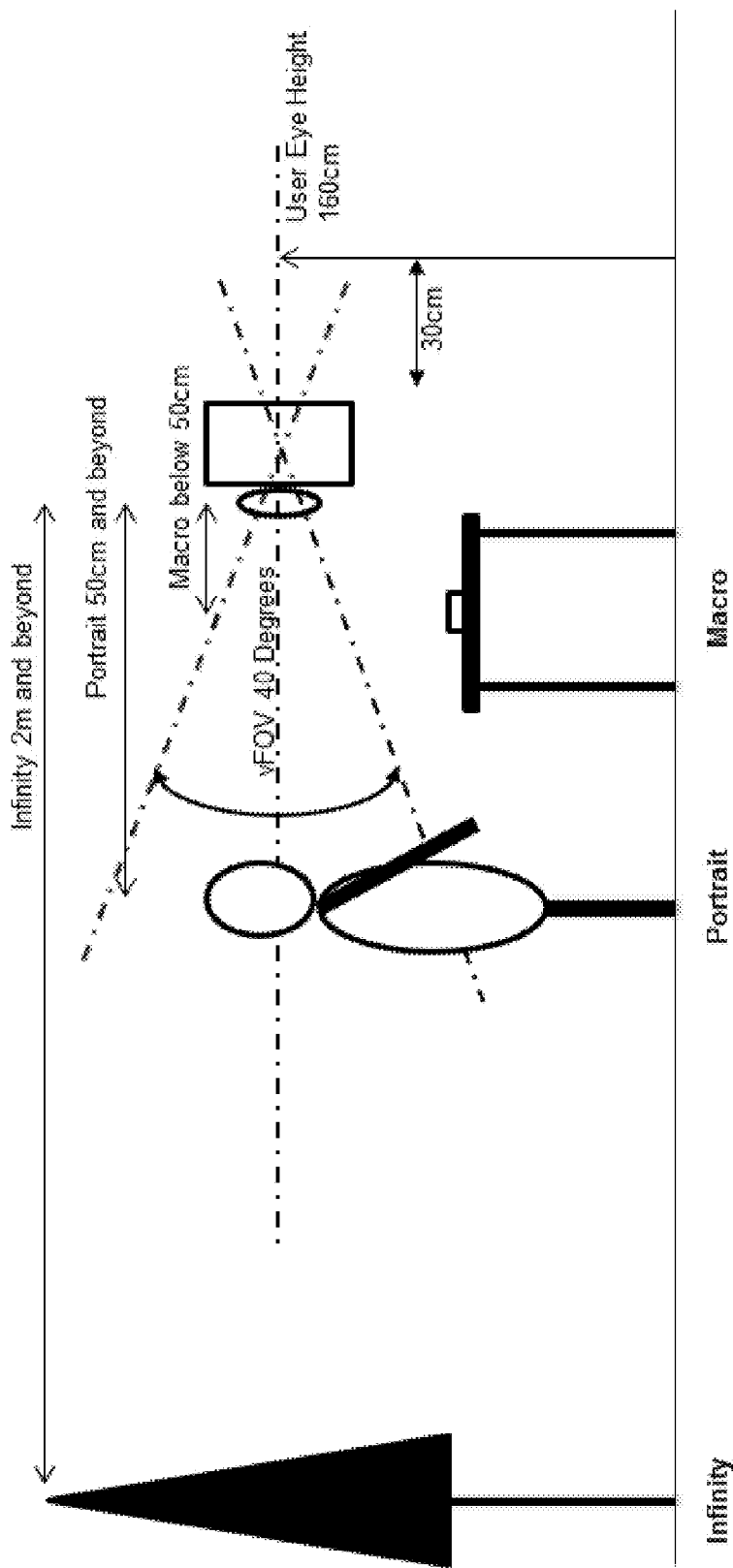

FIG. 24 schematically illustrates objects, distances, and pointing angles for capturing images of objects disposed at different heights and distances relative to a camera module in accordance with certain embodiments.

Figure 25:
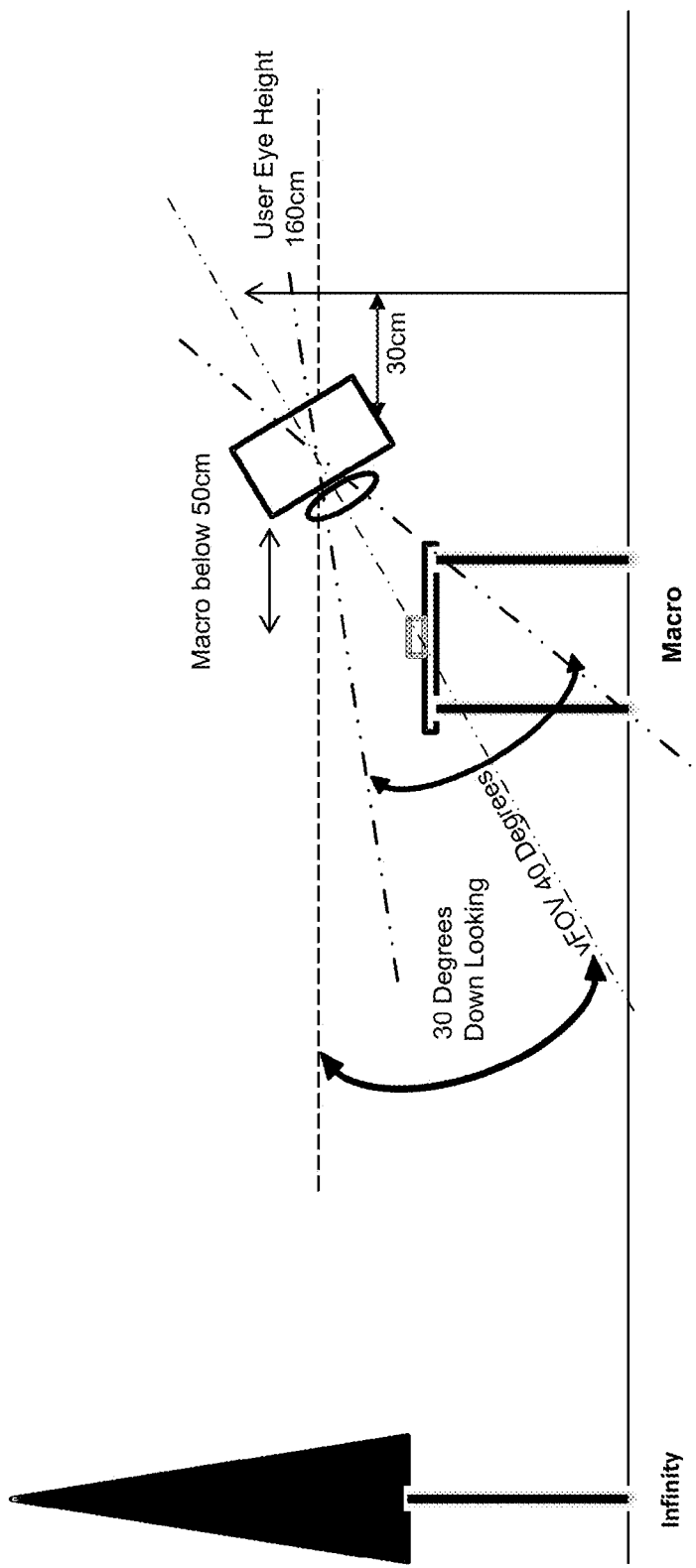

FIG. 25 illustrates a camera module pointed downward at a near object at an angle of 30 degree down from the horizontal.

Figure 26:
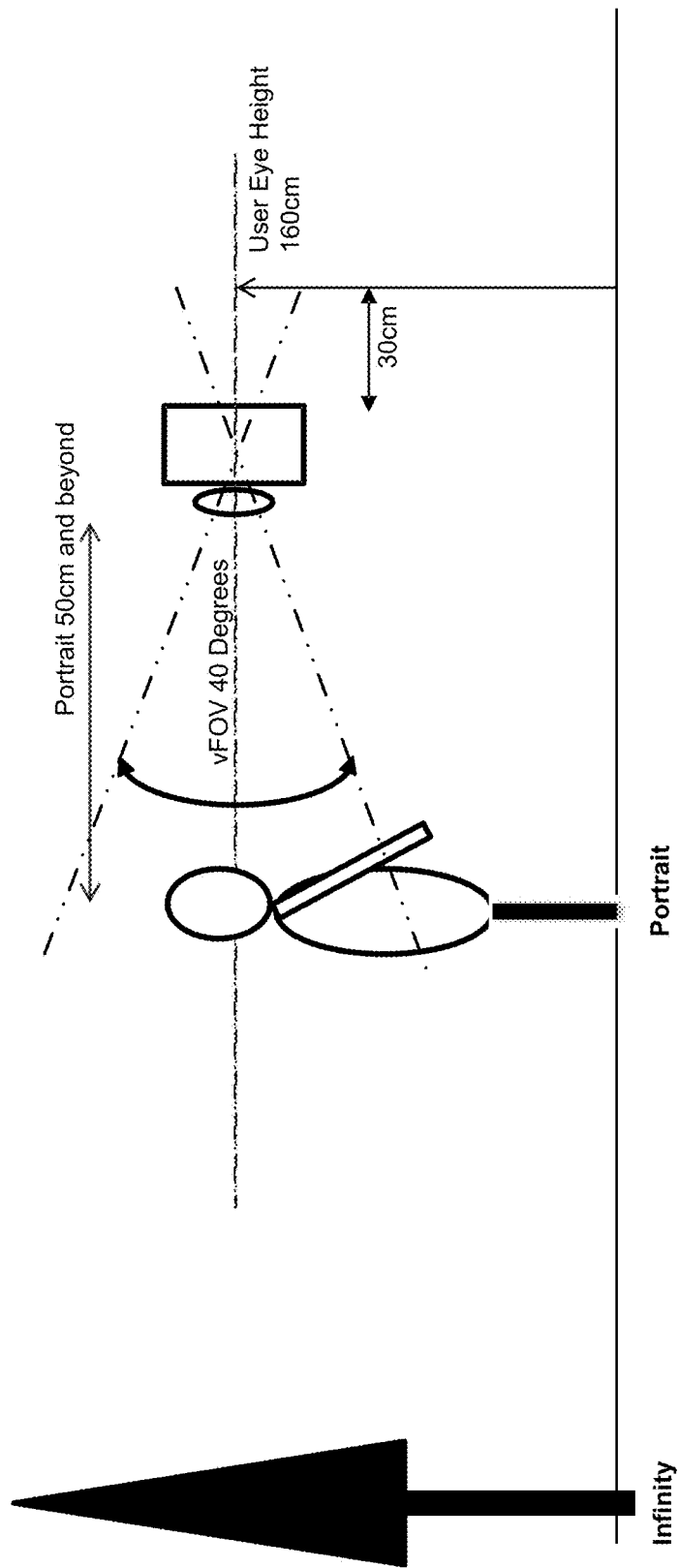

FIG. 26 illustrates a camera module having its optical path in a horizontal plane or in a side orientation.

Figure 27:
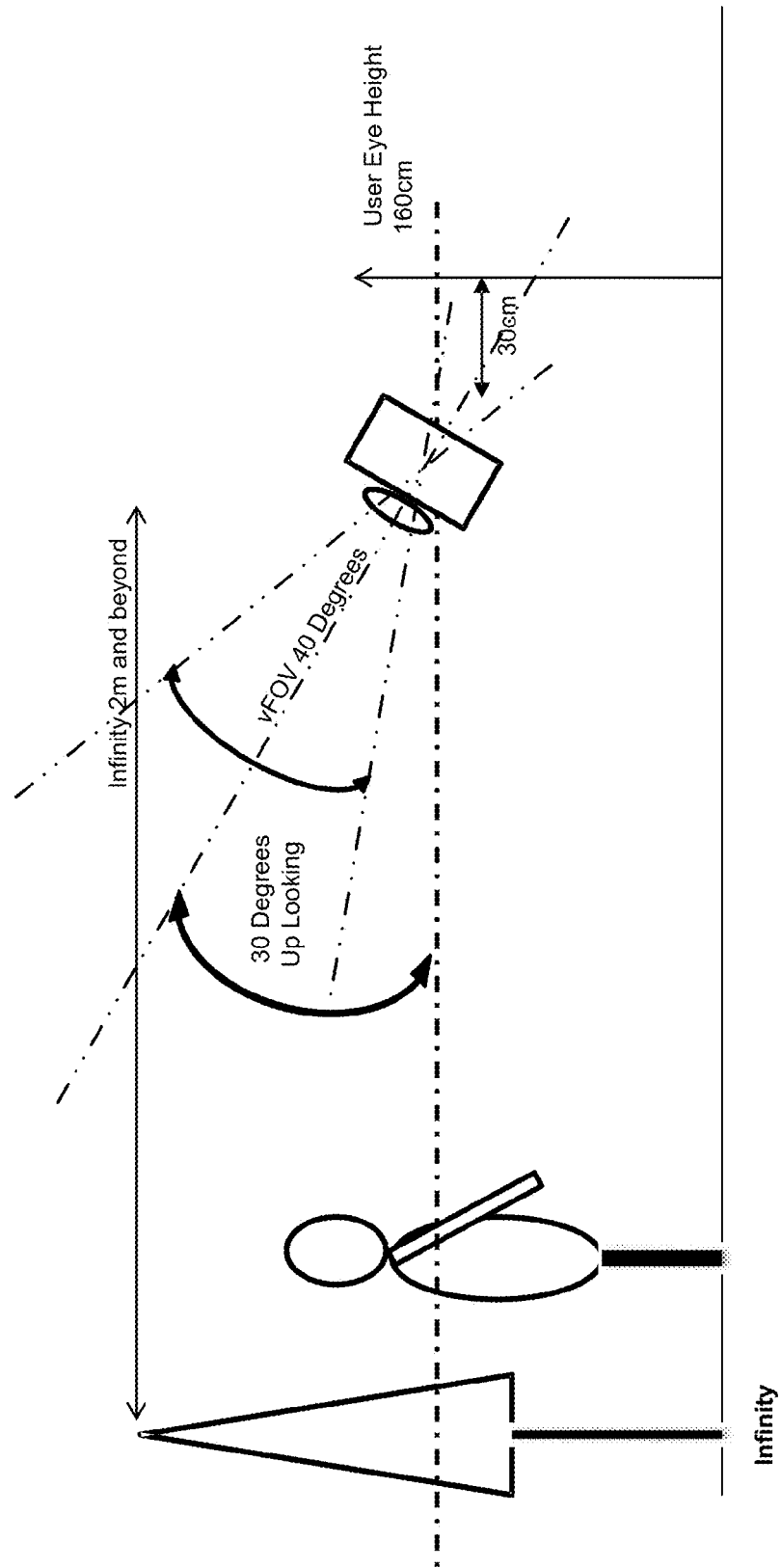

FIG. 27 illustrates a camera module pointed upward 30 degrees higher than horizontal.

Figure 28:
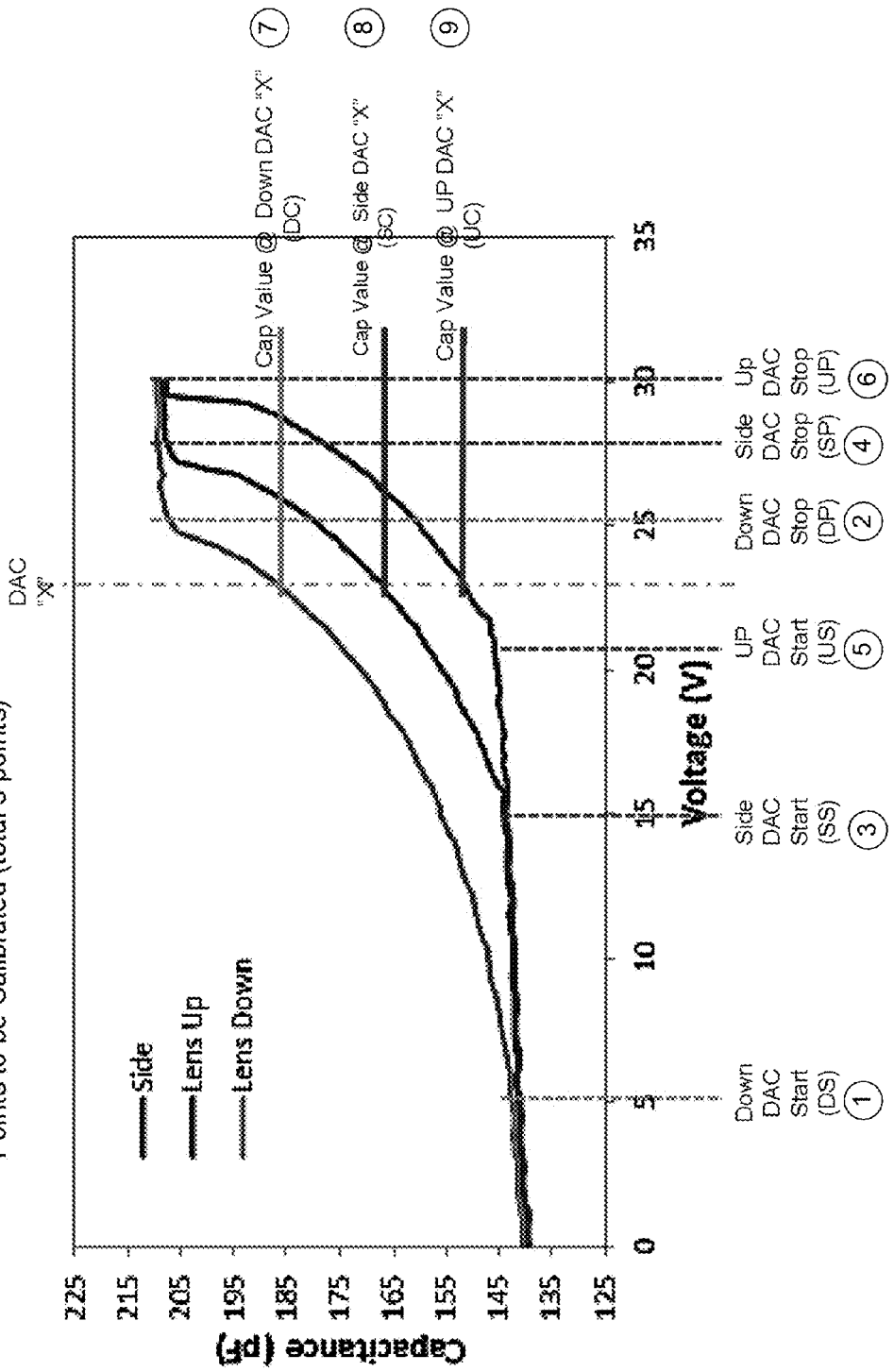

FIG. 28 shows plots of capacitance versus voltage for three camera orientations (up, level, and down) over respective auto-focus ranges of a camera module in accordance with certain embodiments.

Figure 29:
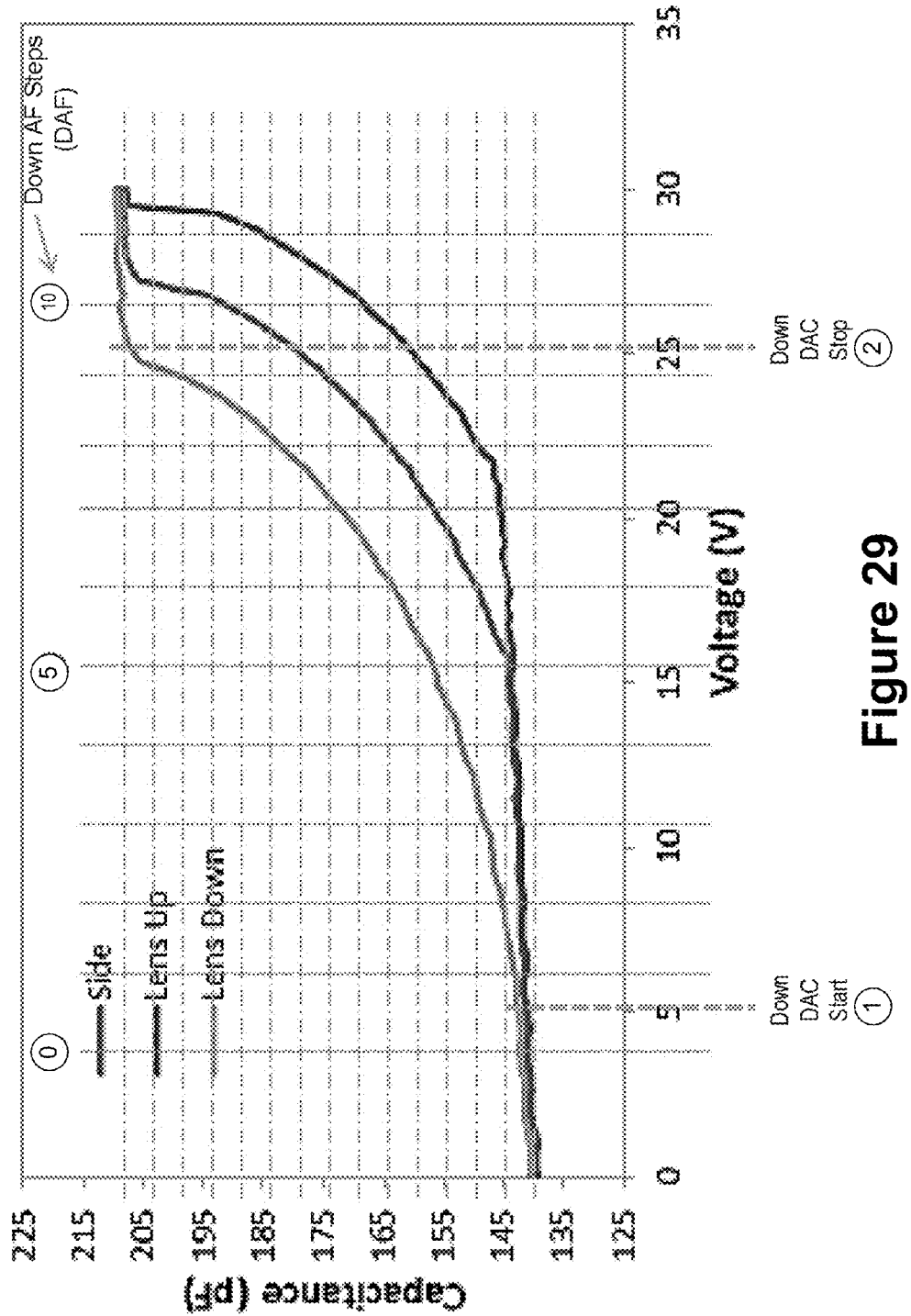

FIG. 29 illustrates a voltage range that is bounded by DAC start and DAC stop Voltages and that is segmented into ten voltage incrementation steps in an auto-focus process for a downward pointed camera module in accordance with certain embodiments.

Figure 30:
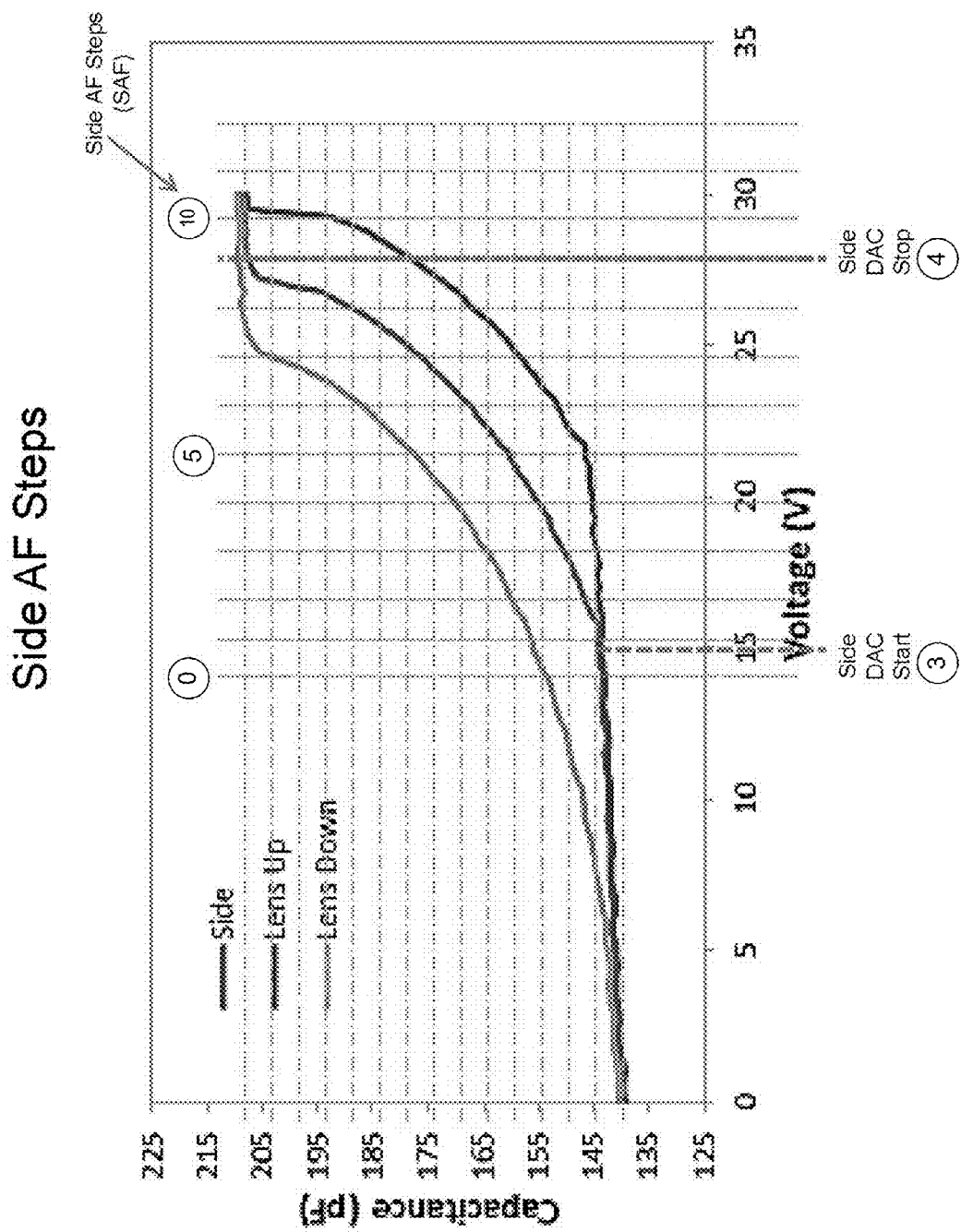

FIG. 30 illustrates a voltage range that is bounded by DAC start and DAC stop Voltages and that is segmented into ten voltage incrementation steps in an auto-focus process for a level oriented camera module in accordance with certain embodiments.

Figure 31:
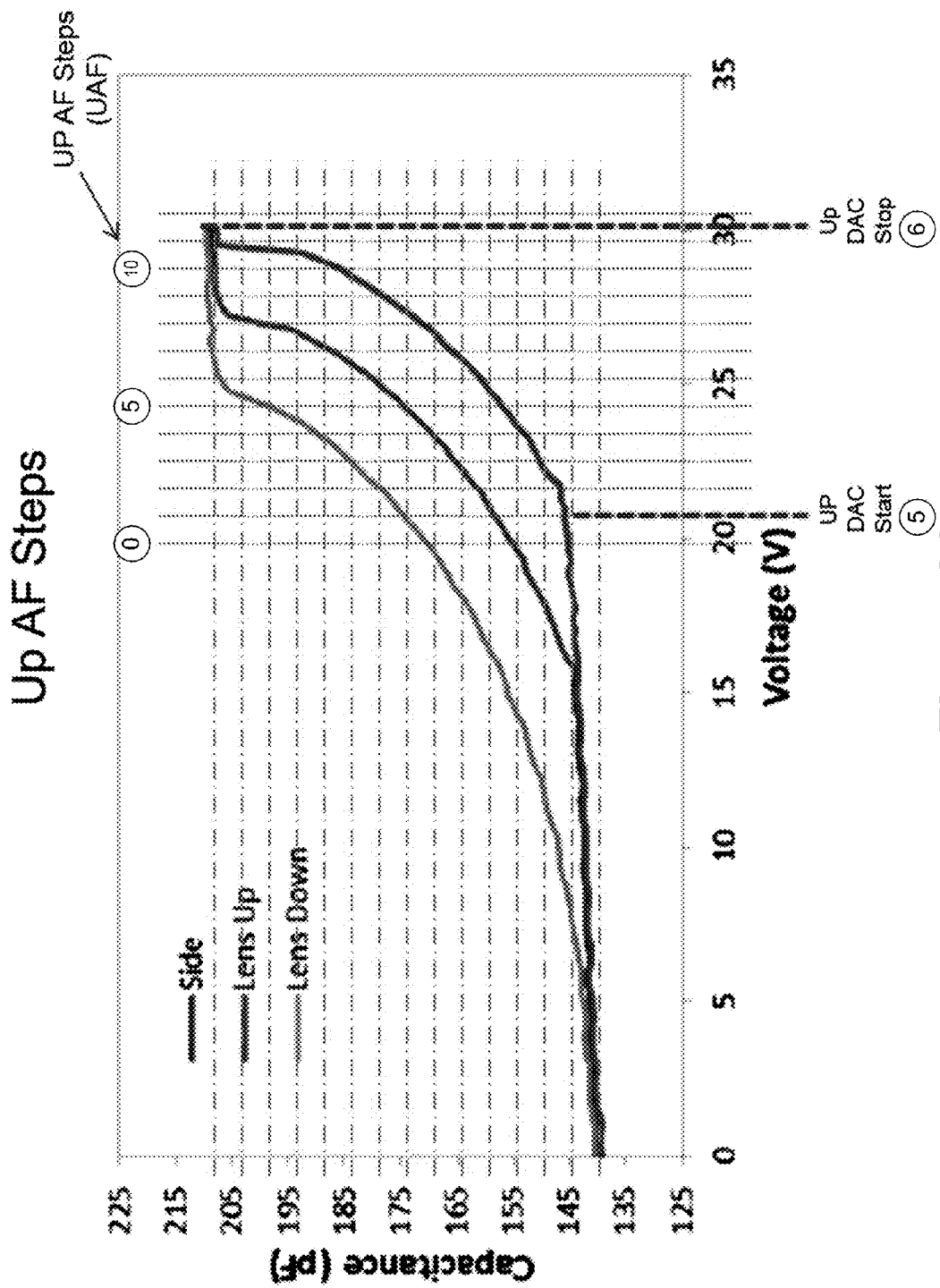

FIG. 31 illustrates a voltage range that is bounded by DAC start and DAC stop Voltages and that is segmented into ten voltage incrementation steps in an auto-focus process for an upward pointed camera module in accordance with certain embodiments.

Figure 32:
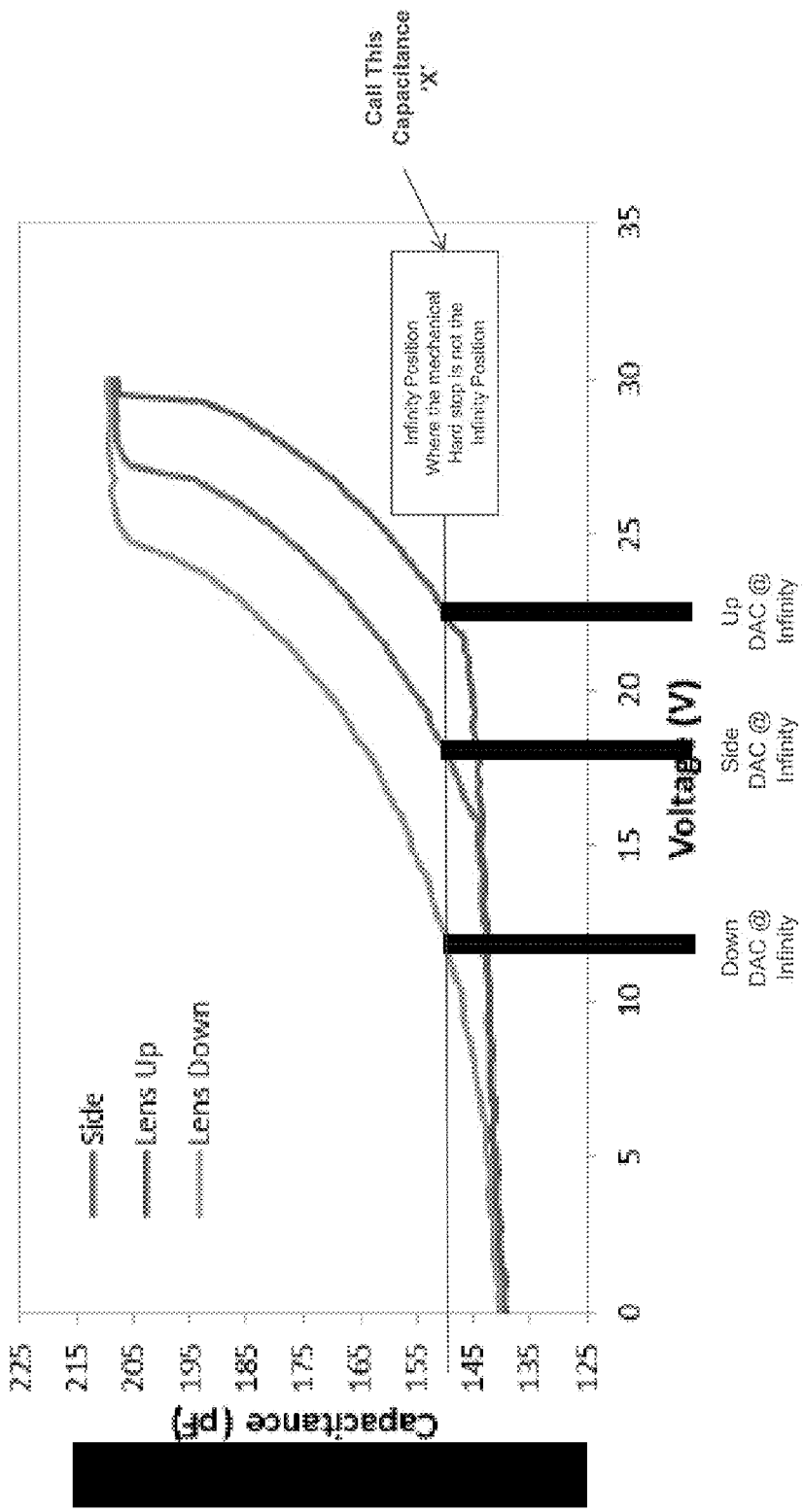

FIG. 32 shows three plots that illustrate floating infinity position control using capacitance sensing in accordance with certain embodiments.

DETAILED DESCRIPTIONS OF THE EMBODIMENTS

Camera modules are provided that are configured to determine their own orientation by using a capacitance sensing capability of an on-board MEMS auto-focus (AF) actuator that is used to position one or more movable lenses at specific locations in accordance with proper alignment and focus calibration of the camera module. Code embedded within the camera module is configured to program a processor to discern the orientation of the camera based on calibrated, calculated or otherwise known effects of gravity on the positioning by the MEMS AF actuator of the one or more movable lenses. Using this orientation feedback information, multiple auto-focus routines, each calibrated to perform particularly well when the camera module is pointed in a direction that lies within a certain sub-range of orientations ranging from straight up through level to straight down, can be determined and selected from. The accuracy, speed, overall performance and efficiency of the auto-focus feature of a camera module in accordance with embodiments of this invention are highly advantageous.

MEMS Actuator

Figure 1:
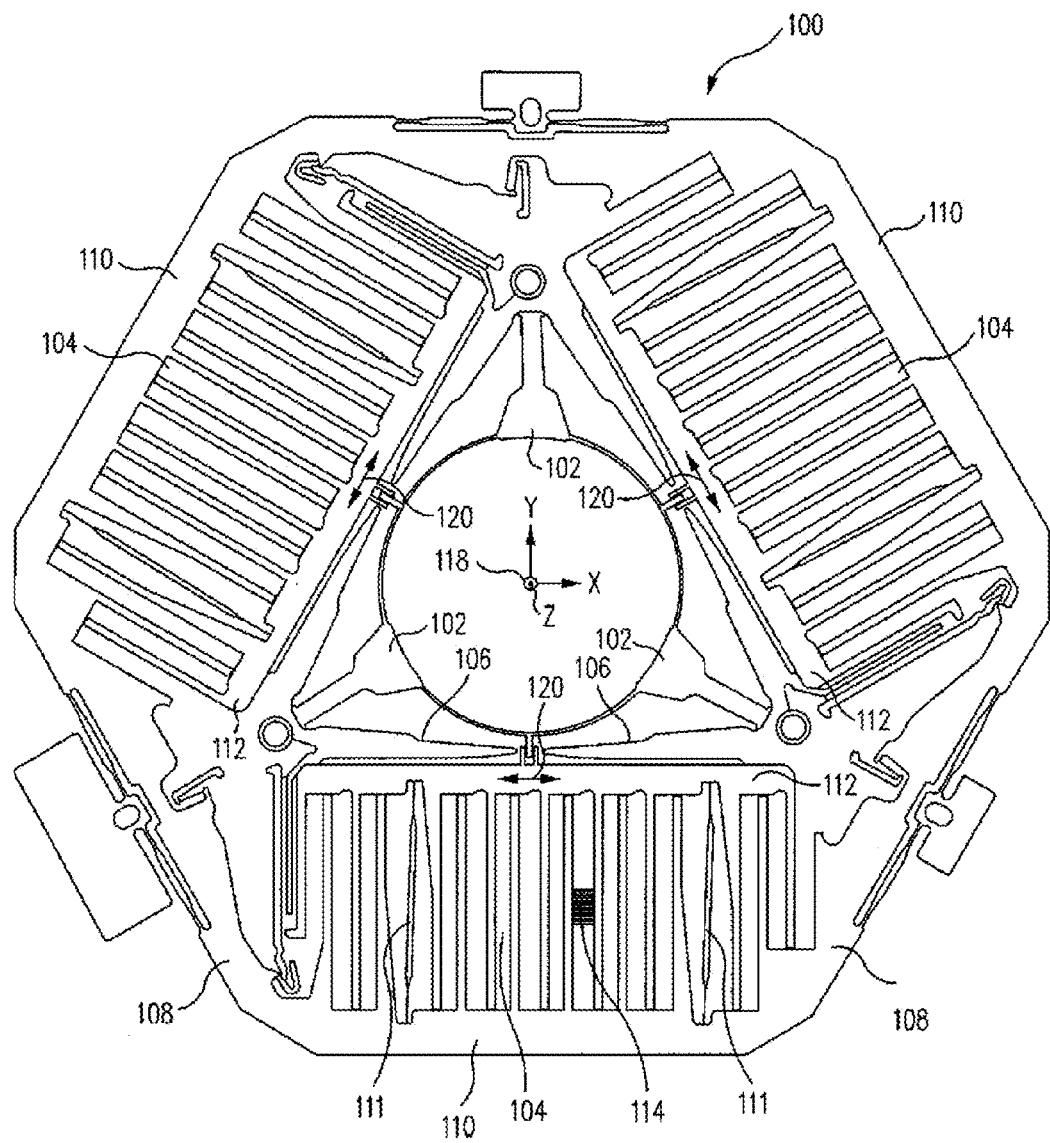

An example of an actuator device 100 adapted to effect movement of an optical element, such as a lens, lens group or an imaging sensor, in a focal plane, i.e., an X-Y plane orthogonal to an optical or Z axis, of a camera, is illustrated in the plan view of FIG. 1 and described in detail at US20120081598, incorporated herein by reference. As illustrated in FIG. 1, in some embodiments, the generally planar actuator device 100 can comprise a stage 102 resiliently supported for movement within a plane of the device 100, three or more actuators 104, each coupled to an outer periphery of the stage 102 through at least one flexure 106 and operable to apply a force acting in the plane of and tangentially to the stage 102 when actuated, and an outer frame 108 surrounding and supporting the stage 104 and the actuators 104 during operation. In the particular example embodiment illustrated in FIG. 1, the device 100 incorporates three actuators 104, but in other embodiments, a greater number of actuators 104 can be used. Additionally, although the actuators 104 in the figure are shown arranged at equal angular intervals around the periphery of the stage 102, viz., at 120 degree intervals, other, even irregular, angular arrangements of the actuators 104 are possible.

Figure 2:
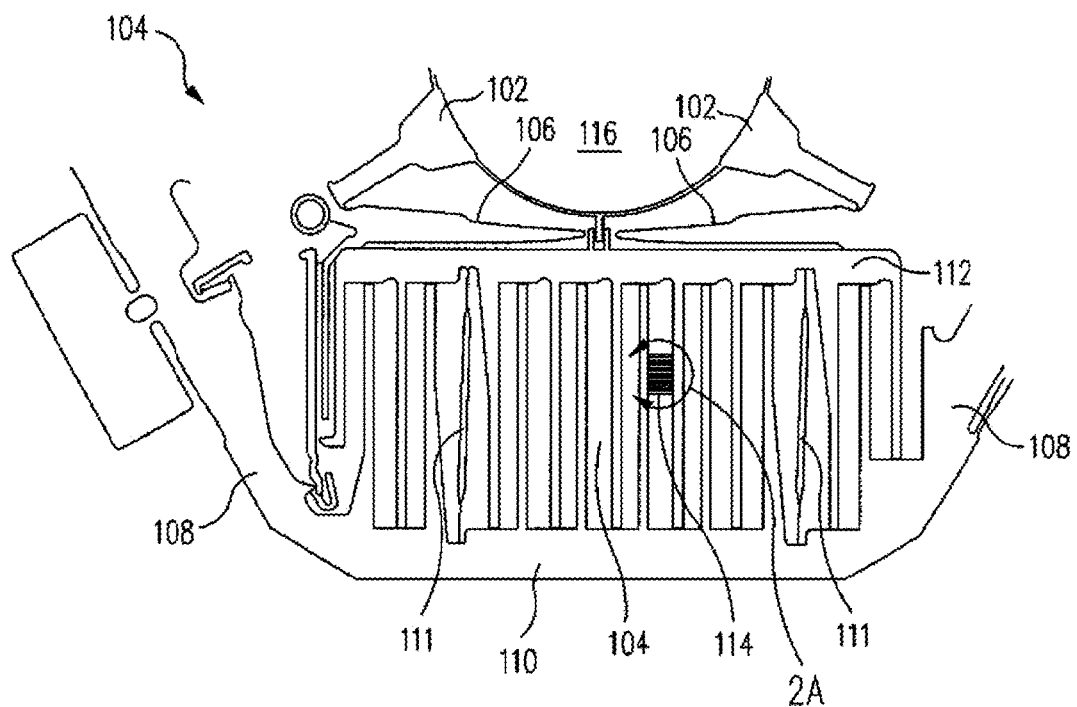
Figure 3:
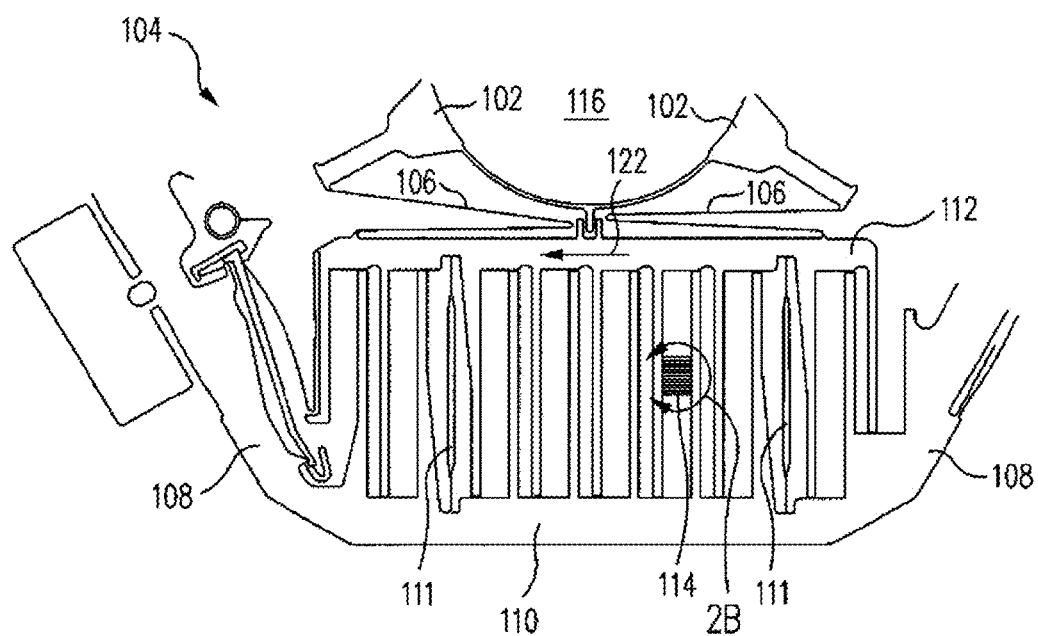

As illustrated in FIGS. 1-3, in some embodiments, the X-Y plane actuator device 100 can comprise a micro electromechanical systems (MEMS) structure that can be fabricated as a single, integral structure from a substrate of, for example, silicon, using well-known micromachining and/or photolithography techniques, and the actuators 104 can comprise, for example, electrostatic "comb drive" actuators, each comprising a fixed frame 110, a moving frame 112 resiliently supported for reciprocal, rectilinear movement relative to the fixed frame 110 by one or more motion control flexures 111, and a plurality of interdigitated teeth 114 alternately attached to the fixed and the moving frames 110 and 112.

As further illustrated in FIG. 1, in some embodiments, the stage 102 can incorporate a central opening 116 defining, e.g., a "lens ring" having a center or centroid 118, and within which, for example, a lens or group of lenses (a "lens group"), or another type of optical element can be concentrically mounted. Alternatively, the central opening 116 in the stage 102 can be omitted, such that the stage 102 defines a moving platform upon which, for example, an imaging sensor, such as a CMOS or CCD integrated circuit (IC) imaging sensor, e.g., a "camera-on-a-chip," can be mounted.

As can be seen in FIG. 1, the moving frame 112 of each actuator 104 is coupled to the stage 102 by a bilaterally symmetrical pair of "leaf springs," or recurvate flexures 106. The flexures 106 are relatively stiff in the Z direction, i.e., in a direction perpendicular to the plane of the device 100 and stage 102, but resiliently flexible in the X and Y directions, i.e., they couple tangential motion of the associated actuator 104 to the stage 102 in a relatively stiff manner, while at the same time, are very compliant in the radial direction, thereby forming a "pseudo-kinematic" coupling arrangement between the actuators 104 and the stage 102.

Accordingly, prior to operation of such actuator devices 100, the moving frame 112 of each actuator 104 can be "deployed" laterally with respect to the fixed frame 110 to a position that is coplanar with, parallel to, and spaced at a selected distance apart from the associated fixed frame 110 for substantially coplanar, rectilinear, reciprocal movement relative to the associated fixed frame 110, and then fixed or latched in that deployed position. As discussed in more detail below, there are several different methods and apparatus for moving the moving frame 112, and hence, the associated moving portion of the teeth 114B, of an actuator 104 to the deployed position, as well as for latching or fixing it in the deployed position. Thus, FIG. 2 illustrates an example actuator 104 in the un-deployed state, and FIG. 3 illustrates the actuator 104 disposed in the deployed state.

In some embodiments, when the actuators 104 have been deployed but no actuation voltages are being applied to them, the deployed position of the moving frames 112 relative to the fixed frames 110 can define a "beginning-of travel," "power-off" or "parked" state of the actuators 104, in which the centroid 118 of the stage 102 remains centered within the actuator device 100. By the application of a suitable voltage differential to certain fixed and moving teeth 114, the actuators 104 can then all be biased to a "half-travel" or "operating" position. Thereafter, an increase in the bias voltage on a given actuator 104 will result in a tangential movement of its moving frame 112 away from the biased position and toward the associated fixed frame 110 thereof, and conversely, a decrease in the bias voltage will result in a tangential movement of its moving frame 112 away from the biased position and the fixed frame 110. Removal of all voltages from the actuator 104 will result in the moving frame 110 returning to its original, beginning-of-travel or power-off or parked position.

There are several different methods and apparatus for moving the moving frame 112, and hence, the associated moving portion of the teeth 114, of an actuator 104 to the deployed position, as well as for latching or fixing it in the deployed position.

Figure 4:
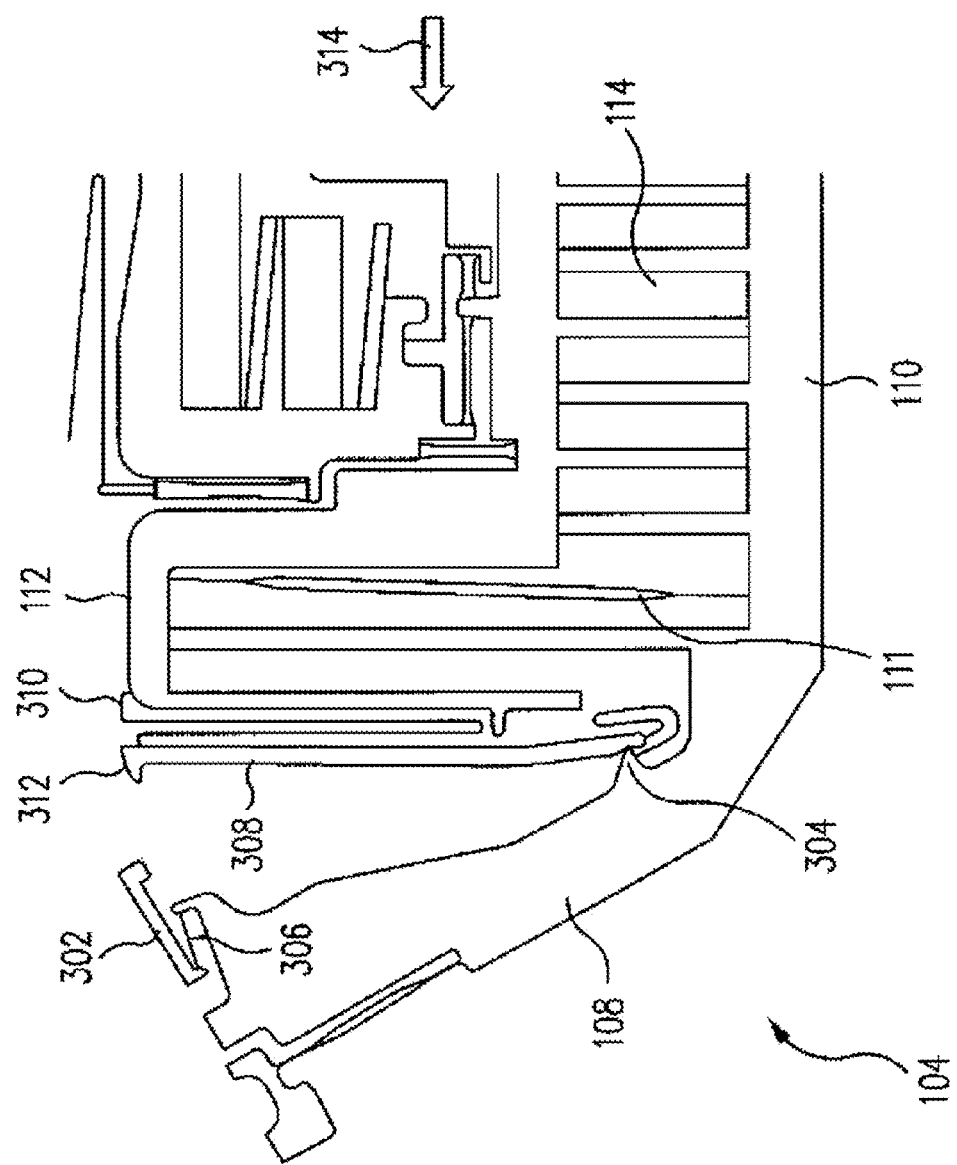

An example embodiment of one such method and apparatus is illustrated in the enlarged partial top plan view of an actuator 104 in FIG. 4. In the embodiment of FIG. 4, the deployment method includes forming a coplanar over-center latch 302 and a fulcrum 304 on the outer frame 108. The latch 302 is coupled to the outer frame 108 with a spring 306. A co-planar deployment lever 308 is coupled to the moving frame 112 with a deployment flexure 310, i.e., a flexure used primarily in the actuator deployment process. The moving frame 112 is, in turn, coupled to the fixed frame 108 by a motion control flexure 111, i.e., a flexure used primarily to control the motion of the moving frame 112 relative to the fixed frame 110. The deployment lever 308 has a surface 312 disposed at an upper end of the lever that is configured as an inclined plane for a camming actuation of and a latching engagement with the latch 302, and a notch at a lower end of the lever that is engaged with the fulcrum 304 for rotational movement of the lever thereabout.

In an example deployment, an acceleration force, e.g., one as might be effected by the weight of the moving frame 112 by a gravitational field acting thereon, is applied to the actuator device 100 in the direction of the arrow 314 while holding the outer frame 108 fixed. This causes the deployment lever 308 to rotate about the fulcrum 404 and toward the outer frame 108. The rotation of the deployment lever 308 about the fulcrum 304 causes the deployment flexure 310 to urge the moving frame 112 leftward away from the fixed frame 110 and to the deployed position, where the camming surface 312 at the upper end of the deployment lever 308 actuates and is engaged by the latch 302 so as to fix the moving frame 112 and associated moving teeth 114B in the deployed position, as illustrated in, e.g., FIG. 2.

Figure 5:
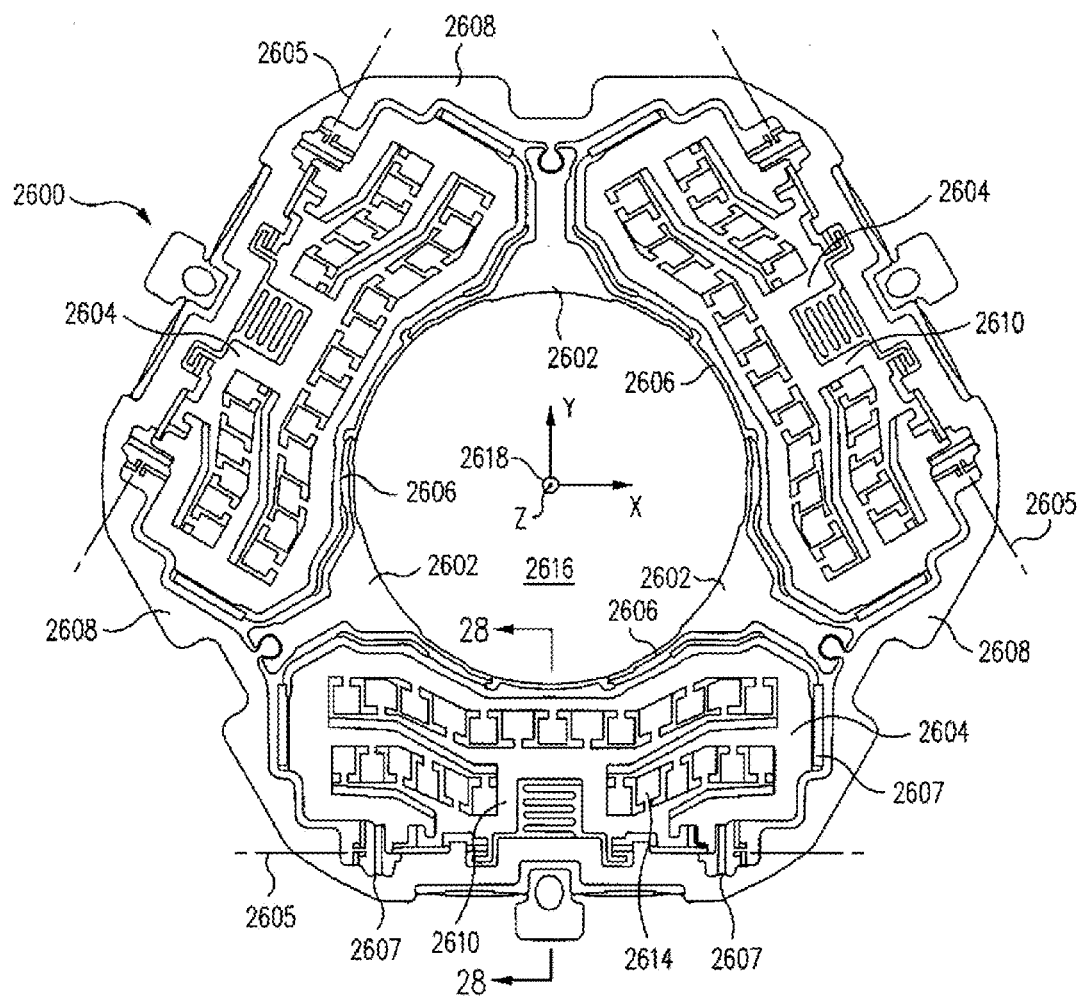
Figure 6:
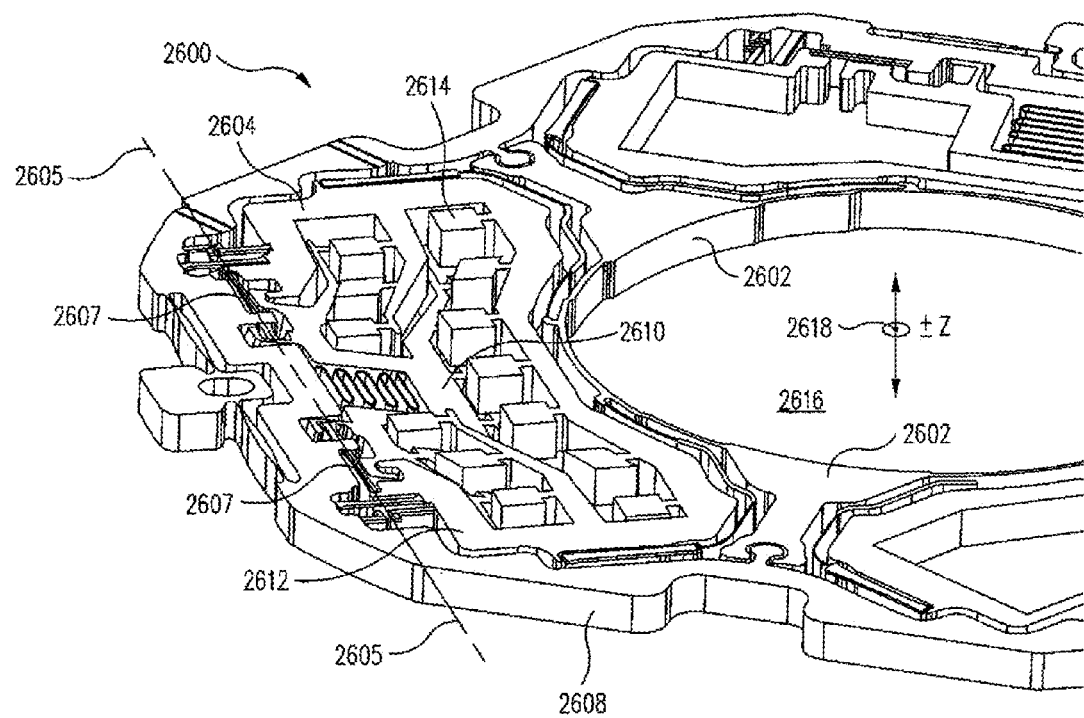

An example actuator device 2600 useful for effecting, e.g., movement of a lens or lens group along an optical or Z axis of a camera or telephoto lens is illustrated in FIGS. 5 and 6 and described in detail in commonly owned U.S. patent application Ser. Nos. 12/946,670 and 12/946,515 each filed Nov. 15, 2010, which are incorporated herein by reference. A miniature lens barrel for a camera incorporating such an actuator device 2600 is described in detail in commonly owned U.S. patent application Ser. No. 12/946,680, also filed Nov. 15, 2010 and incorporated herein by reference.

As illustrated in FIGS. 5 and 6, the generally planar actuator device 2600 comprises a moveable stage 2602 resiliently supported for movement in the .+−.Z direction, i.e., into and out of the plane of the device 2600, two or more actuators 2604, each coupled to an outer periphery of the stage 2602 by one or more solid, resilient hinges, or "flexures" 2606, and operable to apply a respective rotational force in the .+−.Z direction to the stage 2602 when actuated, and an outer frame 2608 surrounding and supporting the stage 2602 and the actuators 2604 during operation. In the particular actuator device 2600 illustrated, three actuators 2604 are provided, but in other possible embodiments, either a fewer or a greater number of actuators 2604 can be employed.

As illustrated in FIGS. 5-6, in some embodiments, the actuator device 2600 can comprise a micro electromechanical systems (MEMS) device 2600 that can be fabricated as a single integral structure from a substrate of, for example, silicon, using well-known micromachining and/or photolithography techniques, and as illustrated in FIGS. 5-6, the actuators 2604 can comprise, for example, electrostatic "comb drive" actuators, each comprising a fixed frame 2610, a moving frame 2612 resiliently supported for rotational movement relative to the fixed frame 2610 and the outer frame 2608, and a plurality of interdigitated teeth 2614 alternately attached to the fixed and the moving frames 2610 and 2612.

Additionally, as illustrated in FIGS. 5-6, in some embodiments, the stage 2602 can incorporate a central opening 2616 having a center or centroid 2618, and within which, for example, a lens, a group of lenses (a lens group) or other types of optical elements can be concentrically mounted for conjoint movement with the stage 2602 in the ±Z direction. Alternatively, the central opening 2616 in the stage 2602 can be omitted, such that the stage 2602 defines a moveable platform upon which, for example, an integrated circuit (IC) comprising an imaging sensor of a known type can be mounted.

Figure 7A:
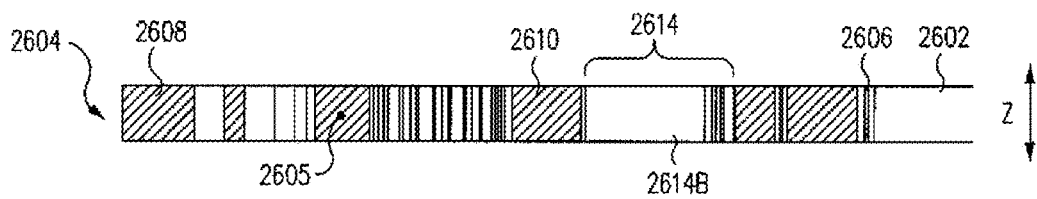
Figure 7B:
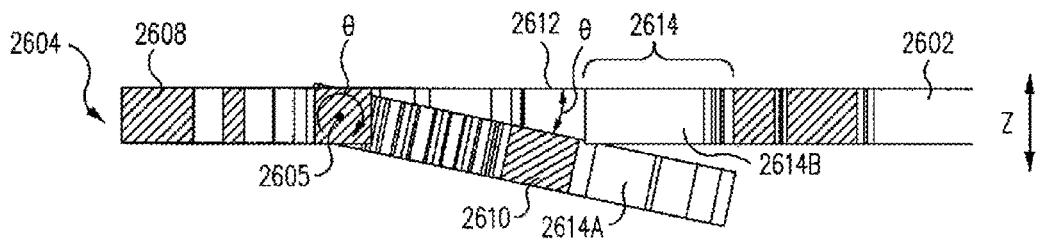
Figure 7C:
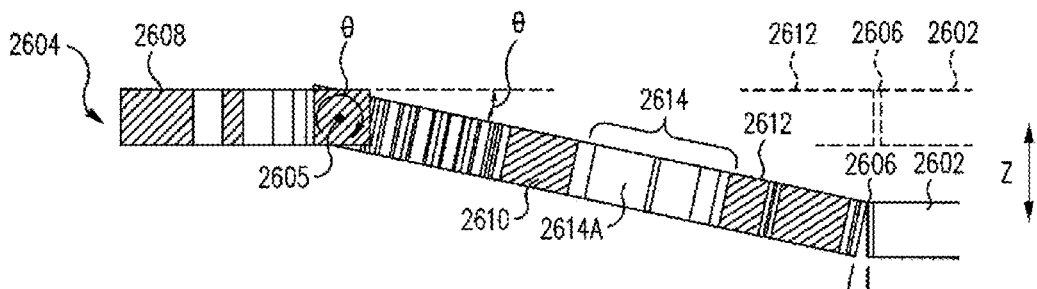

As discussed in more detail in the above commonly owned applications, in some electrostatically actuated embodiments, the actuator device 2600 can be fabricated as a generally planar structure in which the interdigitated teeth 2614 of the actuators 2604 are disposed co-planar with each other, i.e., all lie in the plane of the device. As those of skill in the art will appreciate, in this orientation, the application of a voltage differential to the interdigitated teeth 2614 of the comb drive actuators 2604 cannot result in any desired out-of-plane movement of the stage 2602 in the Z direction. Accordingly, as illustrated in FIGS. 7A-7C, prior to operation of such actuator devices 2600, the fixed frame 2610 of each actuator 2604 is "deployed" to offset the adjacent pairs of teeth 2614 respectively attached to the fixed and moving frames 2610 and 2612 at an angle θ with respect to one another. Such deployment results in a non-planar overall configuration of the actuator device 2600. Methods and apparatus for rotationally deploying such an actuator device 2600 for subsequent ±Z actuation and for fixing them in the deployed state are described in detail in commonly owned U.S. patent application Ser. No. 12/946,646, filed Nov. 15, 2010 and incorporated herein by reference.

As described in the '646 application, when thus deployed, each actuator 2604 then includes a portion, viz., the fixed frame 2610, that extends below the plane of the outer frame 2608, as illustrated in FIGS. 6 and 7A-7C. Once deployed thus, the fixed frames 2610 can then be respectively fixed or locked into position such that they do not move further with respect to the outer frame 2608, and are angularly offset or "rotated" at an angle θ with respect to the associated moving frames 2612. Actuation of the actuator 2604, e.g., by application or removal of a voltage differential across the respective teeth 2614 of the fixed and moving frames 2610 and 2612, will then cause the movable frames 2612 to rotate down and toward or up and away from the deployed fixed frames 2610 to effect a desired rectilinear movement of the stage 2602, and hence, any optical element mounted thereon, in the ±Z direction.

Thus, as illustrated in FIGS. 5-7C, in the particular example actuator device 2600, both the fixed and moving frames 2610 and 2612 are hinged by a plurality of flexures 2607 to rotate downward about a common hinge line 2605 relative to each other and the outer frame 2608. Of course, as discussed in more detail below, other rotational hinging arrangements, not necessarily co-linear, are also possible. As illustrated in FIG. 7A, in the un-deployed state, the outer frame 2608, the fixed and moving frames 2610 and 2612 (together with the interdigitated teeth 2614A and 2614B respectively affixed thereto), and the stage 2602 hinged to the moving frame by the flexures 2606, are all disposed coplanar with each other in the plane of the device 2600.

As illustrated in FIG. 7B, when the actuator device 2600 is deployed for operational use, the moving frame 2610 of each actuator 2604, together with its associated portion of comb drive teeth 2614, is rotated downward about the hinge line 2605 through the deployment angle θ and fixed at that position, leaving the fixed frame 2612, associated teeth 2614B and the stage 2602 remaining disposed coplanar with the outer frame 2608.

As illustrated in FIG. 7C, if different voltages are then respectively applied to the teeth 2614A and 2614B of the fixed and moving frames 2610 and 2612 of an actuator 2604, the moving frame 2612 will be attracted to and rotate downward toward the fixed frame 2612, resulting in a corresponding downward rotational displacement of the stage 2602. However, since the stage 2602 is coupled to the moving frame 2612 by flexures 2606, and because the stage 2602 is similarly coupled to one or more other actuators 2604 disposed on the opposite side of the stage 2602, the stage 2602 will, rather than rotating, move with pure rectilinear movement in the −Z direction. Similarly, a removal of the voltage differential will result in a rectilinear movement of the stage 2602 in the opposite, i.e., in the +Z direction, i.e., back toward its original position.

In the particular example embodiment illustrated in FIGS. 5-7C, the fixed frame 2610 and its associated teeth 2614A are shown rotated downward relative to the moving frame 2612 and its associated teeth 2614B to effect deployment of the actuator device 2600 for operation. However, as will be recognized by those of some skill in this art, a similar result can be obtained by rotating the moving frame 2612, its associated teeth 2614B, and the stage 2602 upward relative to the fixed frame 2610 and its associated teeth 2614A, while leaving the latter features disposed generally coplanar with the outer frame 2608. Such a deployment, as above, will likewise result in a non-planar overall configuration of the actuator device 2600, except that it is the stage 2602, moving frame 2612 and associated fixed teeth 2614B that are then displaced upwardly and out of the plane of the outer frame 2608, moving frame 2610 and associated moving teeth 2614B.

In such an embodiment, if different voltages are then respectively applied to the teeth 2614A and 2614B of the fixed and moving frames 2610 and 2612 of an actuator 2604, the moving frame 2612 and its associated teeth 2614B will, as before, be attracted to and rotate downward toward the fixed frame 2610 and its associated teeth 2614A, resulting in a corresponding downward rotational displacement of the stage 2602. As above, since the stage 2602 is coupled to the moving frame 2612 by flexures 2606, and because the stage 2602 is similarly coupled to one or more actuators 2604 disposed on the opposite side of the stage 2602, the stage 2602 will move, as above, with pure rectilinear movement in the −Z direction, and as above, a removal of the voltage will result in a rectilinear movement of the stage 2602 in the opposite, i.e., in the +Z direction, back toward its original position.

Figure 8A:
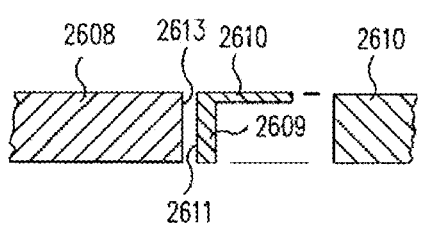
Figure 8B:
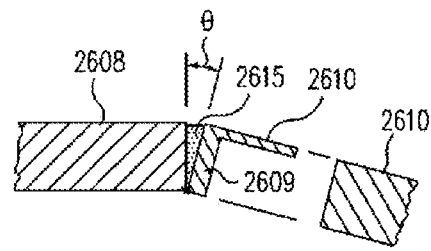

In either case, when the fixed or moving frames 2610 or 2612 of the actuators 2604 have been rotated to their respective deployed positions, it is desirable to fix them at that position relative to the outer frame 2608. As discussed in commonly owned U.S. patent application Ser. No. 12/946,646, incorporated by reference, this fixing can be effected in a number of different ways. For example, as illustrated in FIG. 8A, the fixed frame 2610, for example, can be provided with a deployment foot 2609 having a side wall 2611 disposed in spaced opposition to a side wall 2613 of the outer frame 2608. As illustrated in FIG. 8B, after the fixed frame 2610 has been rotated down through the deployment angle θ a fillet 2615 of, e.g., an adhesive, can be disposed in the angular space between the deployment foot 2609 and the outer frame 2608 to permanently fix the fixed frame 2610 in the deployed position.

While the foregoing and other methods described in U.S. patent application Ser. No. 12/946,646 provide satisfactory measures for deploying and fixing the fixed or moving frames 2610 or 2612 of an actuator 2604 in the deployed position, there may be cases in which it is desirable to deploy and fix the fixed or moving frames 2610 by means of a more positive "latching" arrangement. In accordance with the present disclosure, apparatus and methods are provided for deploying and latching the fixed or moving frames 2610 or 2612 of the actuators 2604 of an actuator device 2600 in the deployed position using such latching mechanisms.

Figure 9:
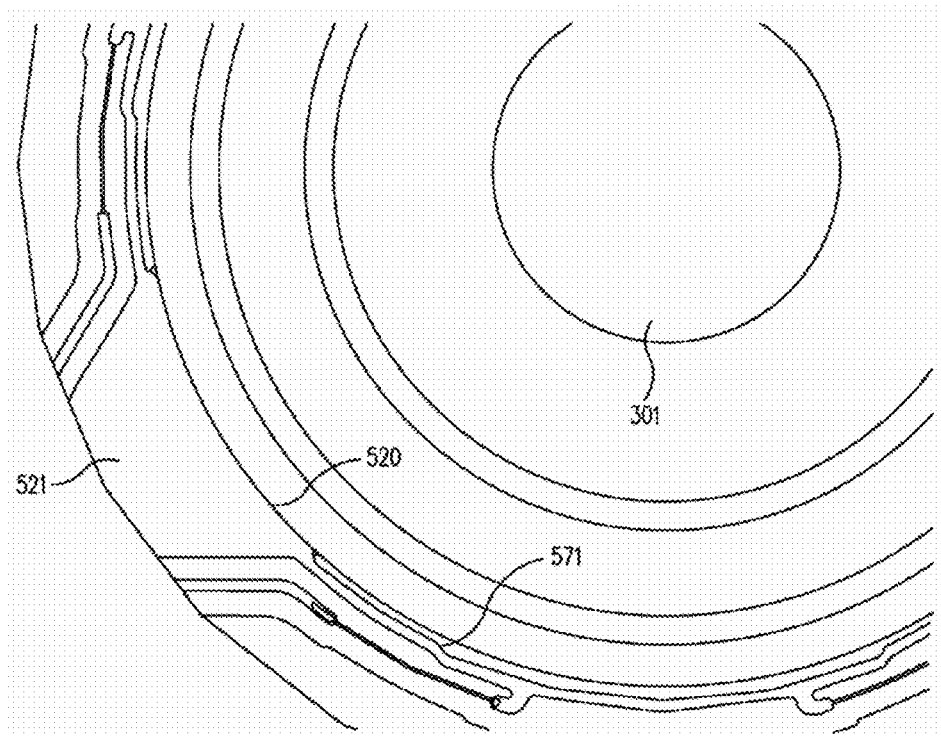

FIG. 9 illustrates a portion of the platform 520 having radial variations 571, in accordance with an embodiment. In one embodiment, the radial variations 571 may be formed in the platform 520 to permit the platform 520 to expand. The radial variations 571 may be angular bends in the platform 520. Thus, an optical element such as the movable lens 301 may be inserted into the opening 405 of the platform 520, which may expand to receive the movable lens 301 and which may grip the movable lens 301. The opening 405 may expand as the radial variations 571 of the platform 520 deform (e.g., tend to straighten), so as to increase the circumference of the opening 405.

Figure 10:
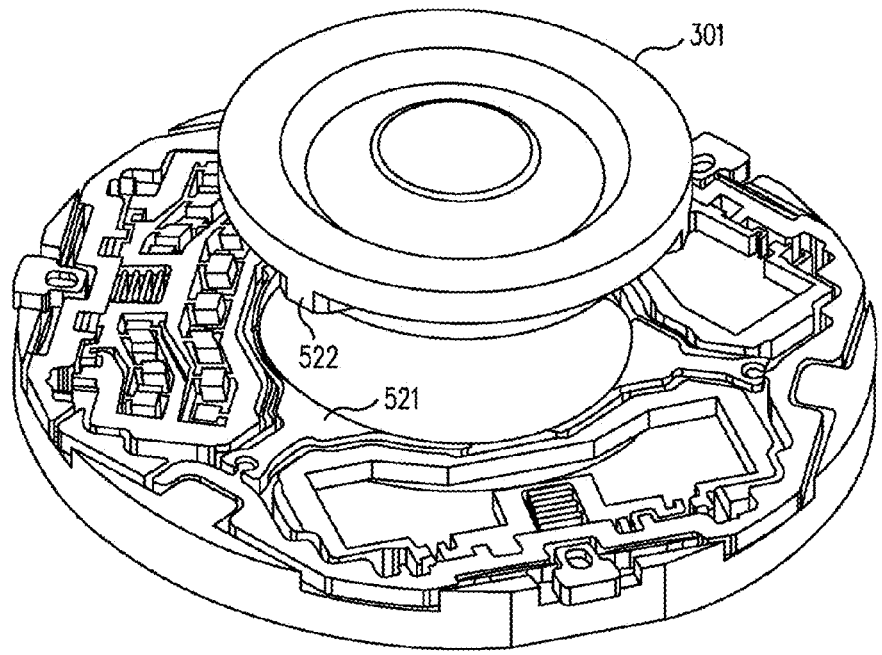
Figure 11:
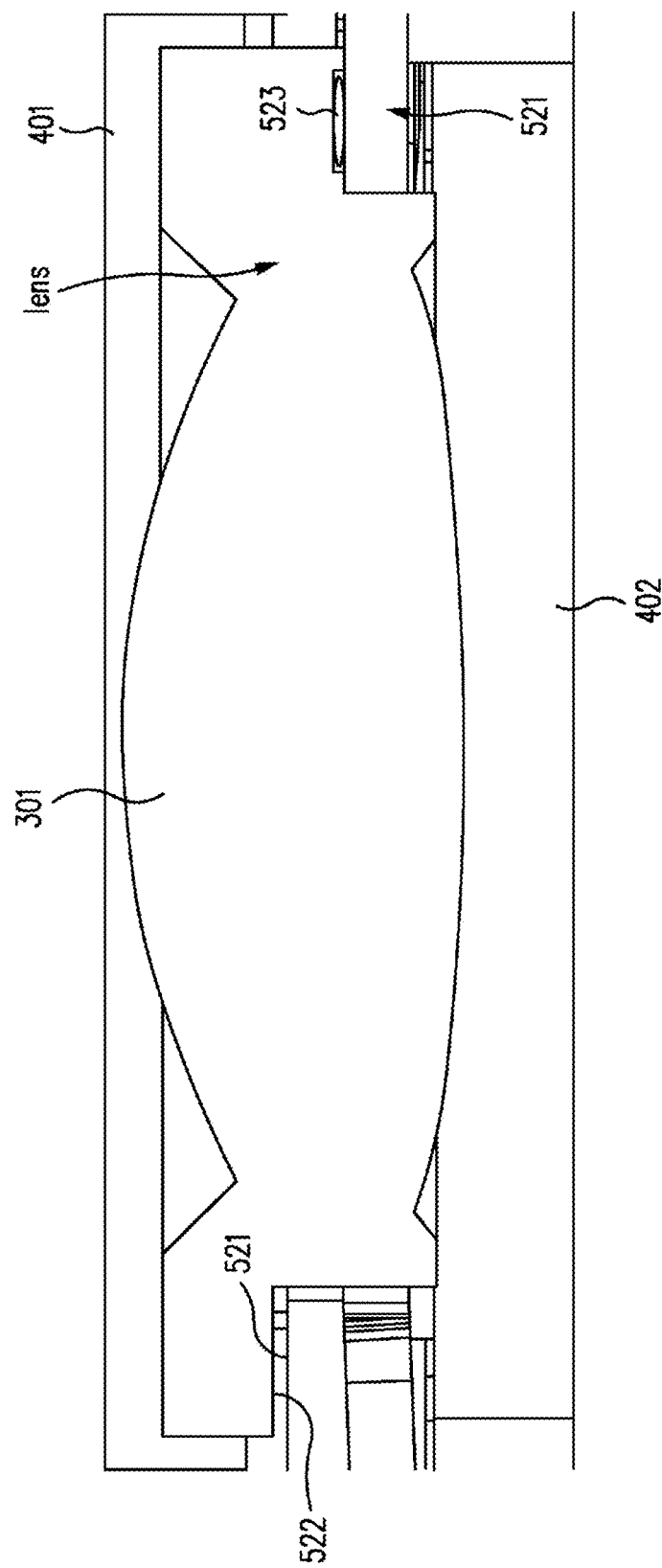

FIG. 10 illustrates a perspective view of a movable lens positioned for mounting to the actuator device 400 and FIG. 11 illustrates a side view of the movable lens 301 attached to the actuator device 400, in accordance with an embodiment. In one embodiment, the movable lens 301 may be adhesively bonded to the platform 550, such as by adhesively bonding standoffs 522 of the movable lens 301 to the lens pads 521. For example, epoxy 523 may be used to adhesively bond the movable lens 301 to the platform 520. The movable lens 301 may be supported by the lens pad 521.

Figure 12:
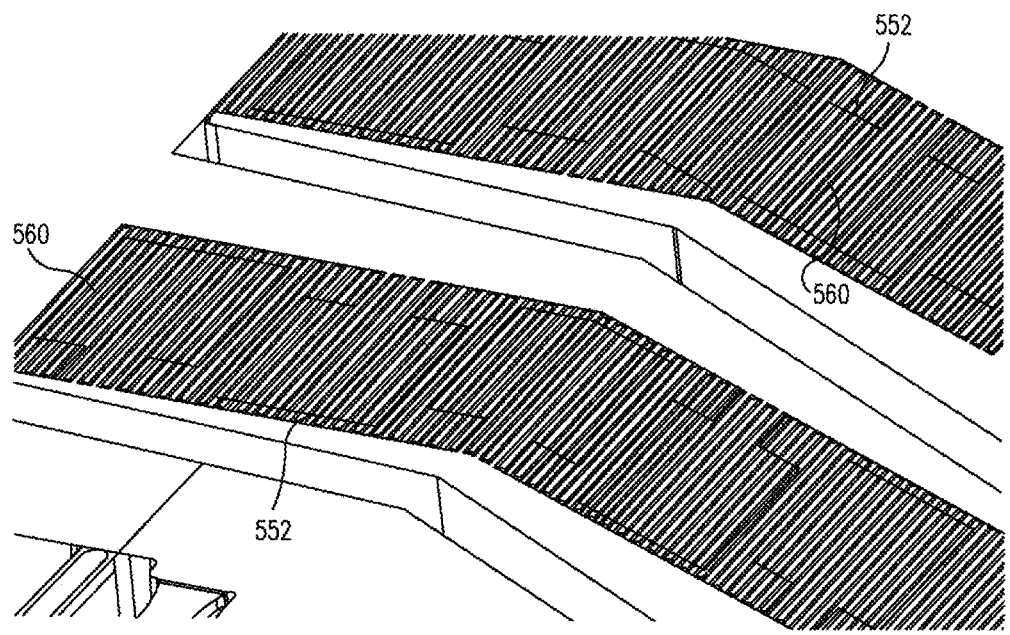

FIG. 12 illustrates a portion of the actuator 550 showing blocks 552 superimposed over the teeth 560 of an actuator 550, in accordance with an embodiment. As discussed herein, the blocks 552 are representative of the teeth 560.

Figure 13:
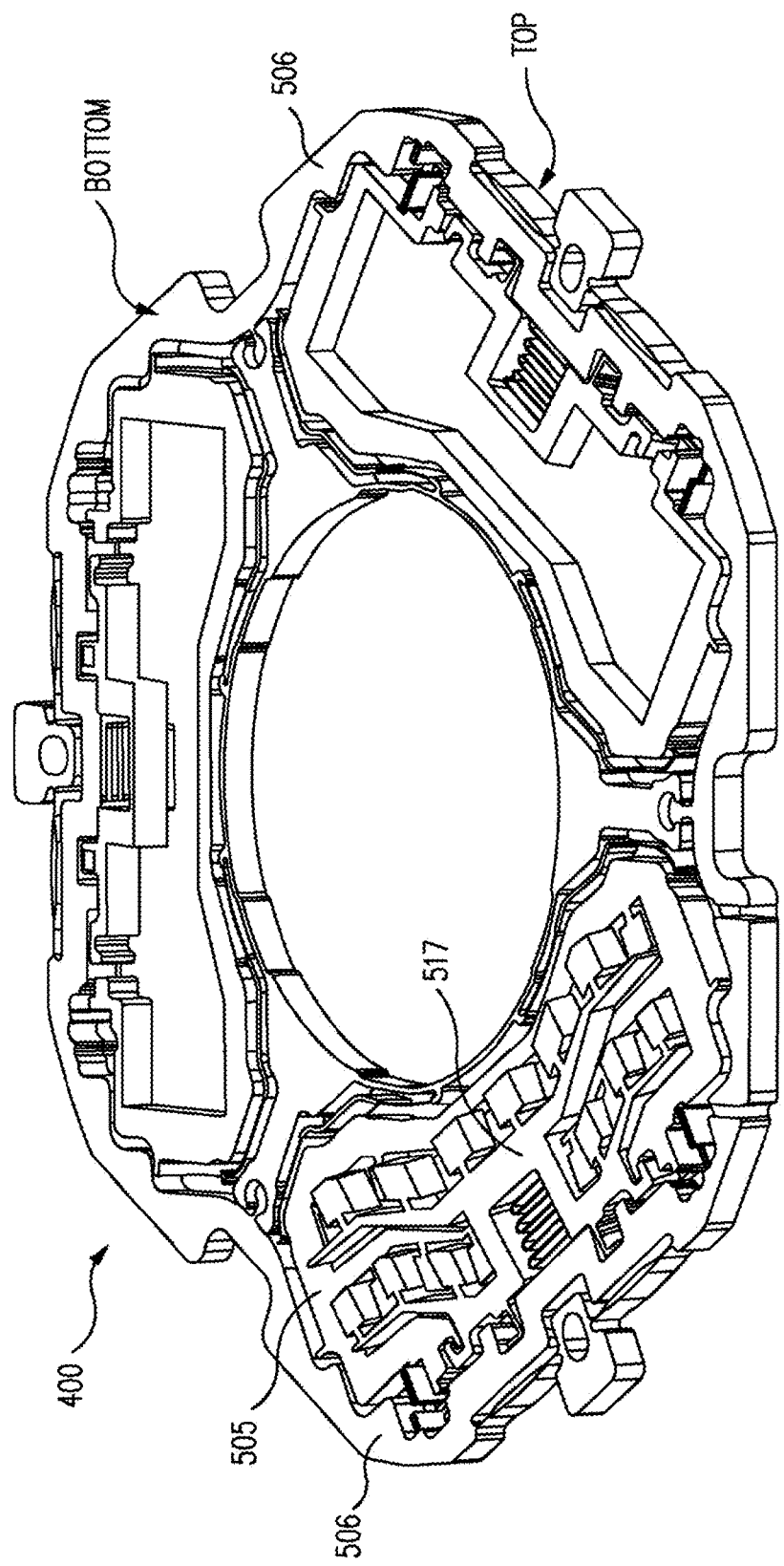

FIG. 13 illustrates a bottom perspective view of the actuator device 400 in a deployed configuration, in accordance with an embodiment. In the deployed configuration the unactuated movable frame 505 is substantially in-plane with respect to the outer frame 506 and the deployed fixed frame 517 is substantially out-of-plane with respect to the outer frame 506 and the movable frame 505.

A voltage may be applied to each actuator 550 via the electrical contacts 404. For example, two of the three contacts 404 may be used to apply a voltage from the lens barrel 200 to the actuator device 400. The third contact 404 may be unused or may be used to redundantly apply one polarity of the voltage from the lens barrel 200 to the actuator device 400.

Substantially the same voltage may be applied to the three actuators 550 to result in substantially the same movement of the moving frames 505 thereof. Application of substantially the same voltage to the three actuators 550 may result in translation of the platform 520 with respect to the outer frame 506 such that the platform 520 remains substantially parallel to the outer frame 506. Thus, an optical element such as the movable lens 301 may be maintained in a desired alignment as the optical element is moved, such as along an optical axis thereof.

Substantially different voltages may be applied to the three actuators 550 to result in substantially different movements of the moving frames 505 thereof. Substantially different voltages may be applied to the three actuators 550 using the three contacts 404 and a common return. Thus, each contact 404 may apply a separately controlled voltage to a dedicated one of the three actuators 550.

The application of substantially different voltages to the three actuators 550 may result in translation of the platform 520 with respect to the outer frame 506 such that the platform tilts substantially with respect to the outer frame 506. Thus, when substantially different voltages are applied, the platform 520 does not necessarily remain substantially parallel to the outer frame. The application of different voltages to the three actuators 550 may be used to align the platform 520 to the outer frame 506, for example. The application of different voltages to the three actuators 550 may be used to facilitate optical image stabilization or lens alignment, for example.

Figure 14:
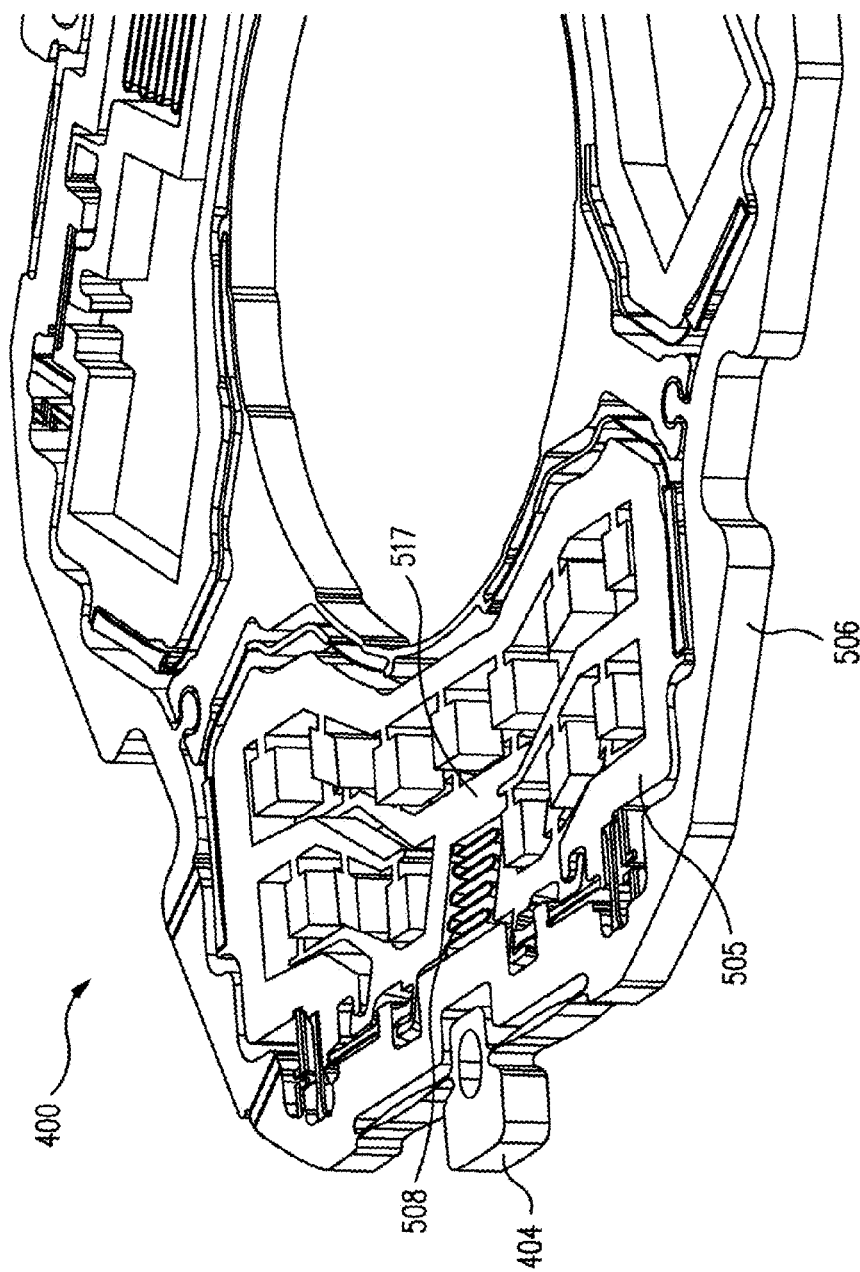

FIG. 14 illustrates a portion of the actuator device 400 in a deployed configuration without any voltage applied thereto, in accordance with an embodiment. Without any voltage applied to the actuator device 400, the movable frame 505 is substantially in-plane with respect to the outer frame 506 and the deployed fixed frame 517 is substantially out-of-plane with respect to the outer frame 506 and the movable frame 505.

Figure 15:
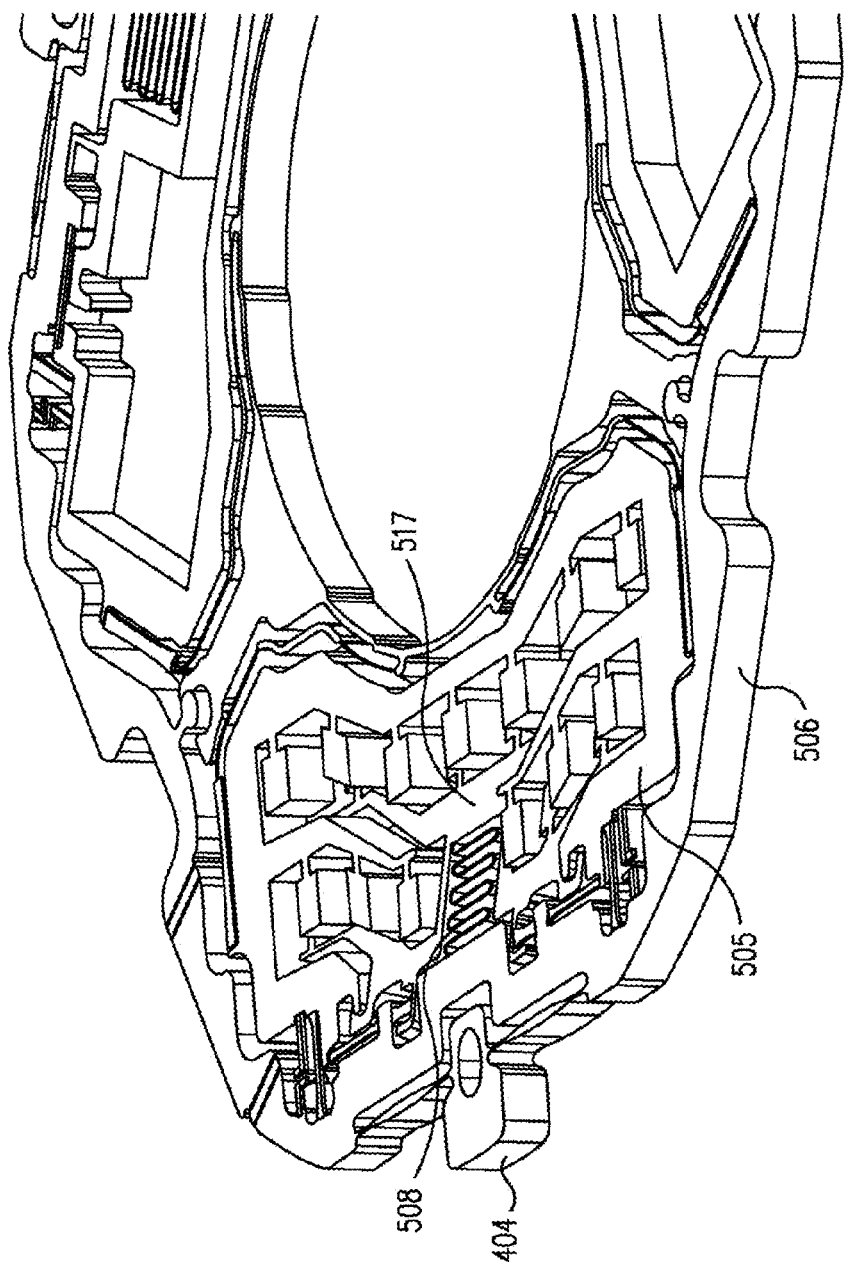

FIG. 15 illustrates a portion of the actuator device 400 in a deployed configuration with a small voltage applied thereto, in accordance with an embodiment. With the small voltage applied, the movable frame 505 has rotated toward the deployed fixed frame 517 and is in a partially actuated position.

Figure 16:
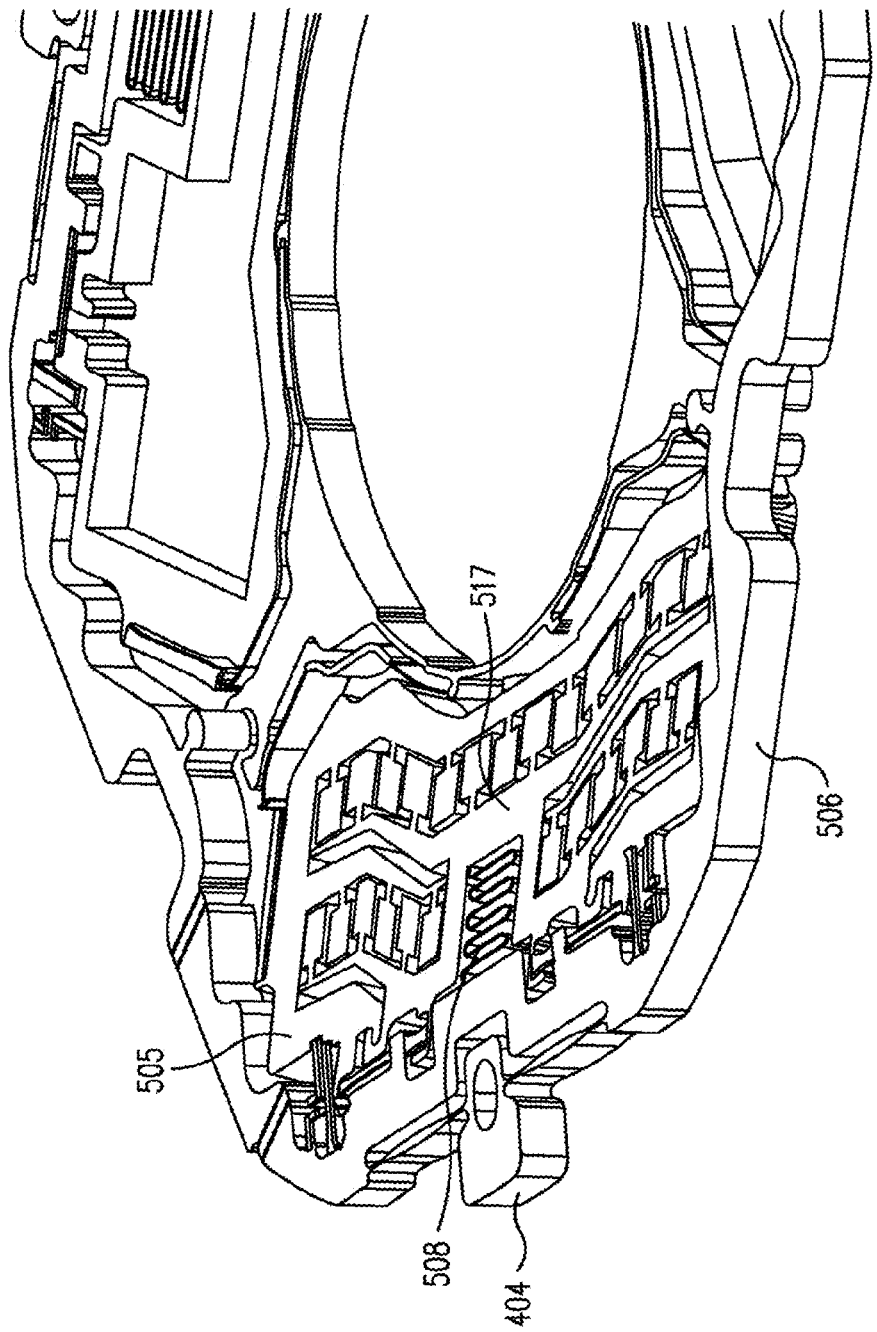

FIG. 16 illustrates a portion of the actuator device 400 in a deployed configuration with a maximum voltage applied thereto, in accordance with an embodiment. As may be seen, the movable frame 505 has rotated further toward the deployed fixed frame 517 and is in a fully actuated position.

Figure 17:
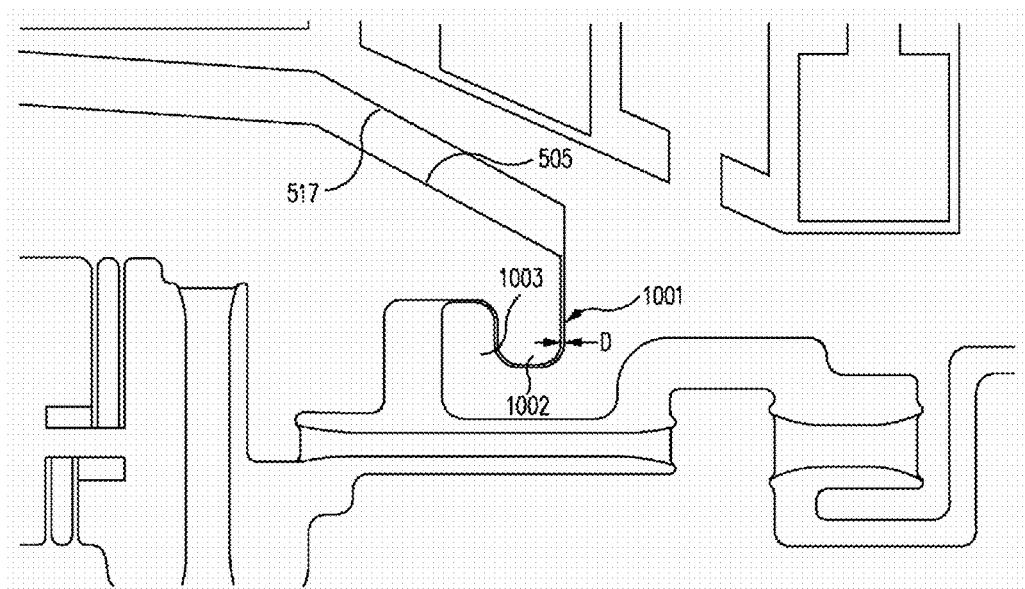

FIG. 17 illustrates a top view of a lateral snubber assembly 1001, in accordance with an embodiment. The lateral snubber assembly 1001 may have a first snubber member 1002 and a second snubber member 1003. The first snubber member 1002 may be formed upon the fixed frame 517 and the second snubber member may be formed upon the movable frame 505. The first snubber member 1002 and the second snubber member 1003 may cooperate to inhibit undesirable lateral motion of the movable frame 505 with respect to the fixed frame 517 (and consequently with respect to the outer frame 506, as well) during shock or large accelerations. A gap "D" between the first snubber member 1002 and the second snubber member 1003 may approximately 2-3 micrometers wide to limit such undesirable lateral motion.

Camera Module as Orientation Sensor

Figure 18:
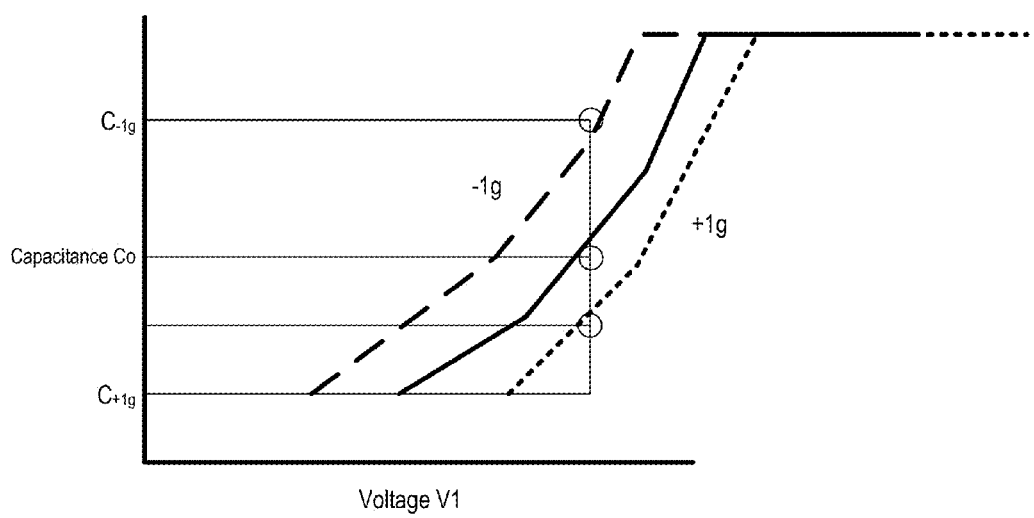

FIG. 18 includes three plots of capacitance versus bias voltage including neutral gravity or level camera module (solid), positive gravity or downward pointed camera module (+1 g, dotted line), and negative gravity or upward pointed camera module (−1 g, dashed line). A lower bias voltage is used when negative gravity −1 g is acting on the camera module, while a higher bias voltage is used when positive gravity +1 g is acting on the camera module compared with applying bias voltage $V_1$ between actuator components to position the lens with tilt alignment (i.e., so it does not look like the Leaning Tower of Pisa) and centering alignment with respect to the image sensor along the optical path of the camera module. Based on the voltage applied to maintain the capacitance at $C_0$, the acceleration can be determined. Alternatively, the voltage can be fixed at $V_1$ while the capacitance is measured to determine the acceleration.

FIG. 19A illustrates a lens being vibrated about the z-axis (parallel to the optical path) to generate an inertial frame to achieve a gyroscopic function in accordance with certain embodiments. FIG. 19B illustrates a lens being vibrated about the x-axis or y-axis (orthogonal to the optical path) to generate an inertial frame to achieve a gyroscopic function in accordance with certain embodiments. By sensing the vibrational motion and deconvolving with the excitation signal, rotation is advantageously measured.

A camera module coupled with an external processor, in accordance with certain embodiments, is schematically illustrated at FIG. 20. The camera module of FIG. 20 includes a lens assembly including a MEMS actuator (or voice coil motor or otherwise) for moving one or more lenses of the lens assembly in an autofocus and/or zoom operation. An imager (or image sensor) and Image Signal Processor (ISP) are also included in the camera module of FIG. 20. The example camera module also includes an ASIC auto-focus driver for rapid adjustment of the one or more lenses by the actuator in an auto-focus control operation.

A feedback system may be used, and auto-focus features may be included as described at US published patent application no. 20120075492 and U.S. application Ser. Nos. 12/944,701, 12/944,703, 13/020,805, 13/077,891 and 13/077,936. In addition, features described at U.S. application Ser. Nos. 13/028,203, '205 and '206 may also be used in alternative embodiments to register images captured that have global or local rotation between them and/or to discern the motion of the camera module and/or one or more objects in a captured scene.

FIG. 20 illustrates schematically a camera module that utilizes actuator voltage inputs and capacitance measurements to achieve orientation sensing functionality without a separate mechanical or physical orientation sensor module. The camera module of FIG. 20 also includes a lens assembly including a MEMS actuator/accelerometer component for moving one or more lenses of the lens assembly in an auto-focus and/or zoom operation. An imager (or image sensor) and Image Signal Processor (ISP) are also included in the camera module of FIG. 20. The example camera module also includes an ASIC auto-focus driver for rapid adjustment of the one or more lenses by the actuator in an auto-focus control operation. A lens tilt control program provides tilt alignment of the lens assembly utilizing the example process described with reference to FIG. 18. Advantageously, the camera module of FIG. 20 has orientation sensing functionality utilizing capacitance and/or bias voltage information that may be already available without use or inclusion of a separate orientation sensor component. A camera-enabled device that includes the advantageous camera module of FIG. 20 also can utilize the orientation sensing functionality without including a separate orientation sensor on the embedded device (e.g., camera phone or digital camera or web cam).

Figure 21A:
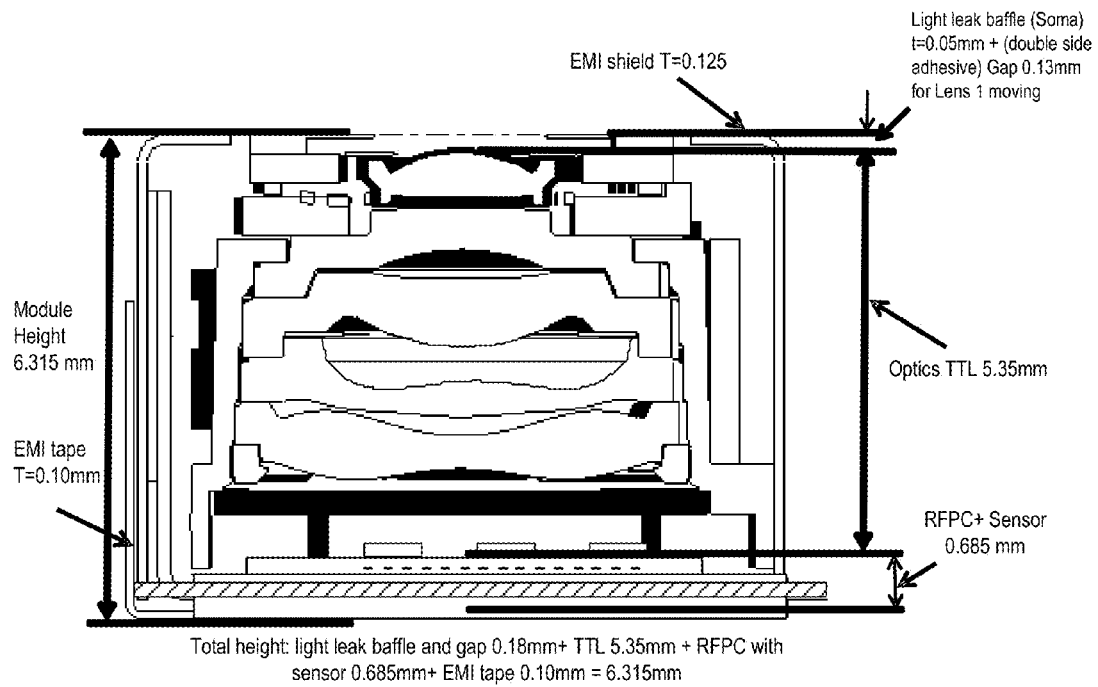
FIGS. 21A and 21B illustrate, in section views, examples of auto-focus camera modules with MEMS actuators and different movable lens groups in accordance with certain embodiments.
Figure 21B:
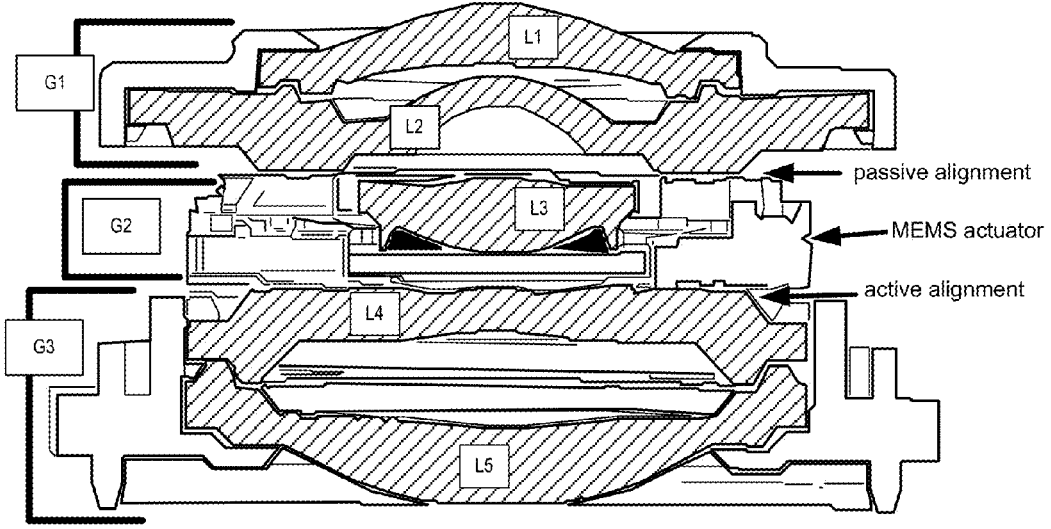

FIGS. 21A and 21B illustrate section views of examples of auto-focus camera modules in accordance with certain embodiments. A lens barrel and EMI shield are snugged together with a spacer filler disposed between them. The lens barrel is disposed over an image sensor and contains lenses for focusing scenes onto the image sensor for capturing digital images. In the example of FIG. 21A, lenses L1-L4 (the four lenses furthest from the image sensor) are movable as a group by the MEMS actuator for auto-focusing the camera module, while in the example of FIG. 21B, lens L3 is movable by the MEMS actuator between two fixed lens groups to achieve auto-focus.

FIG. 22 schematically illustrates a perspective view of an example of a camera module coupled to a flexible printed circuit (FPC). Space between the FPC and the lens barrel may be used by a passive component electrically coupled to the FPC as it protrudes into the corner space of the rectangular camera module that is not otherwise filled by the circular lens barrel, and/or an orientation sensor can be provided in an alternative embodiment within the camera module without growing its size. As many as all four corner spaces of the camera module outside of the lens barrel may be advantageously filled with passive or active electrical components. Alternatively, the camera module corners can be removed to reduce the size of the camera module or to shape the camera module to fit a specific embedded device space.

FIG. 23 schematically illustrate, in exploded view, an EMI shield for covering an assembled version of the camera module components illustrated, for example, in the examples illustrated at FIGS. 21-22.

Relationships Between Camera Module Pointing Angles and Capacitance Values

FIG. 24 illustrates near and portrait distance objects, and other distances and pointing angles for capturing images of objects disposed at different heights and distances relative to a camera module in accordance with certain embodiments. A totally upward pointing camera module would have its optical path aligned in parallel with gravity and be disposed between the ground (or center of the Earth) and an object about to be captured, i.e., gravity is acting to pull the movable lens or lenses toward the image sensor when the camera module has a totally upward orientation. A level camera module would have its optical path in parallel with a horizontal plane in this orientation, i.e., gravity does not have a component that urges the movable lens or lenses of the auto-focus camera module along the optical path. A totally downward pointing camera module would have its optical path aligned in parallel with gravity and be disposed between an object about to be captured and the sky, i.e., gravity is acting to pull the movable lens or lenses of the auto-focus camera module away from the image sensor when the camera module is oriented at a totally downward orientation.

The 180 degree angular range of camera module pointing angles is advantageously segmented into two or more angular sub-ranges in accordance several different embodiments. When the camera module is determined to be pointing in a direction that lies within one of the two or more sub-ranges, an unique set of Data Acquisition Camera (hereinafter "DAC") start and stop voltages and voltage incrementing amounts are used in a predetermined auto-focus operation that is tailored to run a focus search when the camera module is pointed in a direction within that specific angular sub-range. In one embodiment, three sub-ranges are predetermined including a level sub-range illustrated at FIG. 26, within which the camera module is pointed within 30 degrees of horizontal (encompassing a total of 60 degrees), and upward and downward pointing sub-ranges, illustrated respectively at FIGS. 25 and 27, also of 60 degrees each.

In the downward camera pointing angle sub-range, or "Macro User" case, see FIG. 25, a common scenario involves a camera user standing on the ground or at or near the level of an object and within 50 cm or less from the object to the camera module. In this case, the camera user may have to point the camera at a severe downward angle if the object is near the ground. The downward camera pointing angle auto-focus voltage range and steps would be used as in the example of FIG. 25 as long as the optical path of the camera is pointed at least 30 degrees downward from horizontal.

A straight ratio may be applied to determine a switching point between the horizontal and downward camera pointing sub-ranges. For example, the ratio may be governed by capacitance to degree ratio that may be defined as, e.g., the calibrated capacitance facing down minus calibrated capacitance facing horizontal divided by 90 degrees. Thus, switching points may be defined 30 degrees on either side of horizontal that would be 30 times the capacitance to degree ratio. Different capacitance to degree ratios and different multiples of capacitance degree ratios may be used.

In what may be referred to as a "Portrait User" case, see FIG. 26, a horizontal or level auto focus operation may be used that includes a focus search from around 50 cm out to infinity. This may involve extension of the lens to a pre-calibrated and/or calculated 50 cm position, and movement of the lens back towards the sensor in several steps and a focus distance search towards infinity. This may involve a nominal user condition. In an example scenario, where a subject is closer than 50 cm to the camera module, and three consecutive auto-focus statistics show a decline, then the lens may be moved passed 50 cm in a fourth auto-focus search towards Macro.

In what may be referred to as an "Infinity User" case, see FIG. 27, a typical user case for taking a photo facing upward could involve taking a picture close by or taking a picture of an object at a large distance. Thus, an upward camera pointing angle sub-range may be defined, e.g., north of 30 degrees to horizontal.

As in the Macro User case, a straight ratio may be applied in certain embodiments to determine a switching point between the horizontal and upward camera pointing angle sub-ranges. This switching point may be determined using a capacitance to degree ratio, which may be defined in an example embodiment as the calibrated capacitance of a level pointed camera minus the calibrated capacitance of an upward pointed camera divided by 90 degrees. Thus again, the 30 degrees switching point example would be 30 times the capacitance to degree ratio.

In accordance with certain other embodiments which advantageously apply orientation sensing capability to a camera module, an icon may be provided for added choice during camera operation. For example, when a camera in accordance with certain embodiments is determined to be pointing down (such as taking macro), an icon will appear in the LCD or other display that provides one or more options to the camera user or to a remote user. In certain embodiments, an icon is provided that notifies, alerts or asks a question of a camera user or remote user whether a bar code scanner software app is desired to be used. In certain embodiments, an icon is provided that notifies, alerts or asks a user whether a business card scanner software app, or other app configured particularly for scanning a specific document, item or object, is desired to be used. In certain embodiments, an icon is provided that notifies, alerts, asks or communicates an expression to a user in words, images, sounds, vibrations, smells, tastes or in some observable format. Other icon apps are provided in alternative embodiments that relate to the downward looking or downward pointing camera that can then be triggered by sensing that the camera is pointing downward, e.g., by a certain threshold angle below the horizon, and/or that the camera is directed in such a way as to be taking a close (macro) picture or video.

In another embodiment, four sub-ranges are segmented in auto-focus operations optimized for certain sub-sets of camera pointing angles, such as from fully downward to fully upward, 0 to 45 degrees, 45-90 degrees, 90-135 degrees and 135 to 180 degrees. In another embodiment, five sub-ranges are segmented including 0 to 36 degrees, 36 to 72 degrees, 72 to 108 degrees, 108 to 144 degrees and 144 to 180 degrees. In other embodiments, sub-ranges may be smaller near the horizontal than at the poles to achieve greater precision for those more common camera pointing angles, and different numbers of sub-ranges may be predetermined.

An auto-focus operation may involve focus determinations at each of ten or so predetermined voltage incrementing steps between the DAC start and DAC stop voltages determined for the particular camera module pointing angle sub-range for a specific image capture. Focus information is obtained at each of the steps and a best focus position for the movable camera lens group is found, e.g., at a maximum on a plot of focus versus lens position or applied voltage to the MEMS actuator that corresponds to a certain lens position providing optimum focus or the current image capture. The just-described example can be referred to as full traversal auto focus, while other auto-focus techniques may be used in certain embodiments such as hill climb auto focus can be used, e.g., as described at U.S. patent application Ser. No. 61/657,012, which is incorporated by reference, where the auto-focus operation is ended after determining that a maximum focus condition has been passed, but before traversing the entire focus range of the camera module.

Calibration

Start DAC voltages and capacitance readings of upward pointing camera, side or level camera (horizontal) and downward looking camera are calibrated for a camera module utilizing an auto-focus technique based on orientation sensing in accordance with certain embodiments. Moreover, max DAC voltages and capacitance readings of Upward pointing camera module, side or level (horizontal) and downward looking camera are also calibrated for the camera module. Midpoint capacitance readings are also calibrated in certain embodiments for the upward, level and downward pointing camera module orientations. A static DAC number is chosen in certain embodiments at a half way point between the DAC value of start DAC voltage with camera facing upward and the max DAC voltage with camera facing downward. This DAC point may be located in accordance with certain embodiments at a point where a lens or lens group that is movable by the MEMS actuator is away from a mechanical hard stop of both the infinity and macro side with all three orientations (upward, side/level, and downward).

Auto focus camera modules in accordance with certain embodiments are configured with processor-based capability to do the calibration of these points, and to show the data for DAC for the start and max positions (for Up, Side, and Down), as well as corresponding capacitance readings. In one embodiment, changes in capacitance readings are analyzed as the auto focus operation is performed at incremental voltage steps. The number is recorded when capacitance has changed for the start DAC & capacitance values, and when capacitance has stopped changing for the max DAC & capacitance values. For the midpoint, capacitance readings are recorded for upward, side, and downward, after calculating the DAC voltage point halfway between start DAC of upward facing camera and the max DAC of down facing camera.

Autofocus Operation of Camera Module

Keeping with the example embodiment of segmentation into three 60 degree sub-ranges of the 180 degree angular range between the camera module pointing straight up towards the sky opposite gravity and the camera module pointing straight down towards the ground in parallel with gravity, even though six thirty degree sub-ranges, or ninety sub-ranges having angular extend of two degrees per sub-range, or any of a various numbers of sub-ranges of equal or differing angular extent, the auto-focus operation of the camera module according to the example embodiment involves three types of on-the-fly switchable autofocus algorithm steps for upward, side and downward pointing camera modules. In an auto-focus algorithm in accordance with certain embodiments, one step that may even be a first step performed upon triggering the auto-focus, e.g., with a half-press of the image capture button, includes reading the capacitance value at a predetermined midpoint DAC voltage. Another step in certain embodiments includes comparing this read capacitance value with the three calibrated capacitance values of upward, side and downward looking camera. Another step in certain embodiments includes choosing, selecting from a table or calculating an auto-focus that works best based on the comparing for the three orientations of the camera module.

For a downward pointing camera that is pointed towards the ground 30 degrees or more below horizontal, the object or image subject to be captured is most likely closer to a downward pointing camera than midpoint (or more on macro side). The auto-focus search operation will begin then in certain embodiments from the Macro side (or alternatively, the lens can be pushed to the max voltage side where the auto-focus is now stepped towards the starting voltage side), and the step division matches that of the downward pointing camera auto-focus operation.

For an upward pointing camera, the object or image subject is considered likely to be further from the camera than for the downward pointing camera scenario (i.e., with optimum focus more on the infinity side). As such, the AF search will begin in certain embodiments from the infinity side (i.e., lens movement is started from the start voltage side). Auto-focus step divisions will be used that match the upward facing camera steps including the multiple angular segments of the angular sub-range determined for upward pointing cameras for this embodiment.

For the side looking camera having its optical path in parallel with a horizontal plane or within the angular sub-range that includes the level or horizontal direction and in this example pointing up to 30 degrees away from horizontal upward or downward. In certain embodiments, the object or image subject may be considered to be most likely around 50 to 60 cm away, the auto-focus search step may be started at approximately 50 to 60 cm DAC value. This start point may be higher or lower is other embodiments. The auto-focus search will then match the step division of the side (horizontal) facing camera steps. The search in certain embodiments first pushes the lens to the 50 to 60 cm position (or 10 cm, 20 cm, 30 cm, or 40 cm further away from the infinity position, e.g., particularly if no peak is found on a first or second search attempt), after which the search moves the lens back towards the infinity position. If at this point, focus is not achieved, then the auto-focus operation may include a full sweep from infinity towards macro, or the reverse, or until a peak is determined if the hill climb auto-focus method is used.

Example of a Capacitance Data Fed Auto-Focus Search

FIGS. 24-31 illustrate example embodiments of a capacitance data fed auto-focus search for a camera module, e.g., to be included with a camera-phone or tablet or laptop camera or other camera-enabled device. FIGS. 28-31 particularly use certain abbreviations, as follows:
Down DAC Start=(DS)
Side DAC Start=(SS)
UP DAC Start=(US)
Down DAC Stop=(DP)
Side DAC Stop=(SP)
Up DAC Stop=(UP)
Cap Value @ Down DAC "X"=(DC)
Cap Value @ Side DAC "X"=(SC)

Cap Value @ UP DAC "X"=(UC)
  Down AF Steps=(DAF)
  Side AF Steps=(SAF)
  UP AF Steps=(UAF)

Steps that may be included in an example auto-focus search embodiment involving camera module orientation sensing based on MEMS capacitance data and auto-focus searching particularly tailored to an angular sub-range within which the camera module is pointed:

moving a lens or lens group using a MEMS actuator (or another suitable actuator, if any, depending on the system constraints) to a position DAC "X" as illustrated for example at FIG. 28 (this may take 10 ms, e.g.);

reading a capacitance value of the MEMS actuator (e.g., this may take 10 ms);

comparing the capacitance value obtained in the reading step with one or more calibrated capacitance values of position DAC "X" of multiple angular sub-ranges, e.g., such as downward, side and upward pointing capacitance values in one embodiment (or alternatively, comparing with two or even one value or with more than three particularly in embodiments involving segmentation into more than three sub-ranges, or alternatively calculating and/or extrapolating based on one or more differences between the read and calibrated values, or a combination of these);

selecting one or more auto-focus search voltage values including start and stop DAC voltages and voltage increments or a number of increments between the start and stop DAC voltages based on whichever the capacitance value obtained in the reading step or the "Read" capacitance value, is closest to out of selected values such as the three calibration values for downward, side and upward pointing camera modules; and then:

if the "Read" Capacitance value is closest to the downward pointing camera calibration value, then the downward pointing autofocus start, stop and step widths may be selected in certain embodiments, e.g., as illustrated at FIGS. 25 and 28-29; or if the "Read" Capacitance is closest to the side pointing camera calibration value, then the side pointing auto focus start, stop and step widths may be selected in certain embodiments, e.g., as illustrated at FIGS. 26, 28 and 30; or if the "Read" Capacitance is closest to the upward pointing camera calibration value, then the upward pointing auto focus start, stop and step widths may be selected in certain embodiments, e.g., as illustrated at FIGS. 27, 28 and 31.

Camera Orientation Based Auto Focus Performance Enhancement

Using a measured capacitance of a MEMS actuator at the position DAC "X", it is possible with calibrations having been performed for a selected number and/or angular extent of angular sub-ranges of a full angular range of 180 degrees (or perhaps less than 180 degrees if the camera module is rarely used for angles between straight up, and/or down, and 10, 20, 30, or 40 degrees, e.g., closer to horizontal than pointing straight up) to determine if the camera is pointing closer to upward, sideways/level or downward.

Using this information, an auto-focus search can be performed by a camera module that is adjusted to best fit an auto-focus routine that is better suited for either Up, Side or Down facing camera modules to counter the gravity effect on the lens, as each orientation of the camera module involves different auto-focus step sizes to counter the reduction or the increase of each auto-focus step size due to the gravity effect on the actuated lens. So, e.g., referring again for a moment to the three example capacitance versus voltage plots of FIG. 28, a downward pointing camera module auto-focus search voltage range is shown to be significantly smaller than an upward pointing camera module auto-focus search voltage range, while the extent of the side pointing camera module AF search voltage range is illustrated to be between those of the upward and downward pointing camera module AF ranges.

In an initial step or one of the initial steps of an auto-focus operation that would take between 5 ms and 20 ms in certain embodiments (e.g., the movement may take 10 ms and the capacitance reading may take another 10 ms). In the case of a camera running at 30 frames per second, each frame would take 33 ms, meaning within one frame or $1/30$ of second, the camera system is capable of judging which orientation the camera is in and adjusting an AF operation accordingly.

An interim step of the DAC "X" capacitance read can be performed to check the orientation of the camera during the continuous AF operation that can be used so that the step size of the AF may be adjusted accordingly.

CODA

Based on results of running a capacitance orientation determination algorithm (CODA), e.g., as described herein, one can select one of multiple special case AF algorithms to improve speed and precision in finding best focus position.

If a result of running the CODA is a determination that the camera is pointing down or within 60 degrees of straight down or other selected sub-range, there is high chance that the camera user will be taking a Macro picture or video, and thus the AF search step may be started from the Macro position (instead of the infinity position), and use the DAF step best fit for a camera module that is pointing down and thus short cut the search for best focus position of the movable optic or optics of the auto-focus camera module (that may or may not also include zoom, electronically or optically).

If the result of running the CODA is a determination that the camera is pointing up or within 60 degrees or less of pointing straight up at the sky, then based on an enhanced likelihood that the camera user will be taking a landscape picture of a mountain or buildings in the distance, the AF search step may be started in certain embodiments from the infinity position, and use the upward pointing camera module auto-focus that is best fit for use with camera aimed upward.

If the result of CODA is a determination that the camera is pointing horizontally, there is considered to be an enhanced chance that the camera user is taking a picture of a human subject in Portrait mode, and thus the AF search may be started, e.g., from a focus distance camera to object distance of 50 cm or other such distance between 25 cm and 75 cm or 100 cm. In this case, a side pointing camera module auto-focus search can be performed that is best fit for a camera module that is pointing horizontally at an object or subject.

For auto focus actuating embodiments according to various technology areas, one can use other sensing methods, such as, for example, a gyro that is included in a camera module, a camera-enabled phone or other mobile device, or another position sensor that is included in a camera-enabled device or camera module, such as a Hall sensor or a PD sensor. One can determine if or when or whether a user has the camera-enabled device or camera module or camera facing downwards, sideways or upwards. From this information and/or on one or more metadata, an auto focus algorithm may be selected in accordance with certain embodiments to drive an autofocus actuator such as VCM, Spring-less VCM, Piezo, or an actuator that will be affected by gravity in its actuation, in accordance with a example embodiments. Thus once the orientation of the user is known, a camera module, camera or camera-enabled device will perform one or more operations in accordance with certain embodiments, where three examples are provided below:

In a first example, if the orientation sensing is deemed to determine that the camera is pointing down, it is considered in certain embodiments there may be higher chance that the camera user will be taking Macro picture or video, thus the AF search step will start from the Macro position (instead of Infinity position), and use the DAF step particularly fit for pointing down. In this embodiment, a reliable short-cut is provided when finding focus.

In a second example, if the orientation sensing is deemed to determine that the camera is pointing up, it is considered in certain embodiments there may be a high chance that the camera user will be taking a Landscape picture, e.g., of a mountain, skyline, or certain buildings or structures, thus the AF search step will start from the Infinity position, and use the UAF step particularly fit for pointing up.

In a third example, if the orientation sensing is deemed to determine that the camera is pointing horizontally, it is considered in certain embodiments there may be a high chance that the camera user is taking a Human subject in Portrait mode, thus the AF search step will start from the, e.g., 50 cm (close to subject standing 50 cm away), and use the SAF step particularly fit for pointing horizontally.

How Capacitance Feed to Keep Lens at Infinity

When floating the lens to the infinity position, the lens will be suspended in certain embodiments by the MEMS spring away from the mechanical hard stop of the lens/MEMS spring combination. FIG. 32 shows three plots that illustrate floating infinity position control using capacitance sensing in accordance with certain embodiments.

In certain embodiments, a first calibration of the capacitance 'X' value corresponds to the lens position relative to sensor image surface, and where the best focus is achieved for an infinity image. This can be done by finding a peak focus point with an image chart placed at infinity distance, and then recording the capacitance value.

The calibrated capacitance 'X' value is then used in the auto focus search in accordance with certain embodiments, where a capacitance value of an actual lens may be constantly or periodically or intermittently checked with reference to this capacitance 'X' value, and correction may be made so that the lens stays approximately at the capacitance 'X' value. This ensures that no matter where the orientation of the camera is adjusted to, the lens position for infinity will not be affected by gravity (i.e., gravity pulling or pushing on the MEMS spring). A closed control loop in accordance with certain embodiments keeps one or more lenses at one or more certain positions using MEMS capacitance sensing capability. This information is also applied advantageously in certain embodiments to another focus position such as Portrait or Macro focus.

Using Capacitance 'X' Value to do Camera Orientation Sensing

Using the calibrated capacitance 'X', which keeps the lens afloat away from a mechanical hard stop of a MEMS actuator of an auto focus camera module in accordance with certain embodiments, and at the position of infinity, the following method is used to do orientation sensing in accordance with certain embodiments.

When capacitance is read for a particular orientation to position a lens, and compared to a calibrated capacitance 'X' value, positional feedback is utilized advantageously to correct an effect of lens position due to gravity. A corresponding DAC value of the read capacitance may be read back. Based on this DAC value, the device determines whether this corresponding DAC value is close to a Down looking DAC value, Side looking DAC value or Up looking DAC value. The DAC values of Down, Sideways and Up are recorded during the capacitance 'X' value calibration in certain embodiments.

After the orientation is determined, then the autofocus algorithm can pick the best AF search step or a particularly-suited search step, where if the camera is determined to be pointing down, then the AF search will use the down looking MEMS actuating slope search step, and also search from Macro towards the Infinity.

In the Case for Continuous Auto Focus

In case of continuous autofocus, capacitance checks can be used to see if a lens has moved due to gravity when the device or camera module movement is stopped with a lens at a certain position. The capacitance sensing may determine that the camera is facing down, such as when camera is 45 degrees down and gravity is pulling the lens down and away from the original lens position. Continuous autofocus is triggered in certain embodiments for focus search, e.g., instead of not knowing which way a search starts from, i.e., the Macro side or to the Infinity side or somewhere in between. In certain embodiments, the lens may be moved towards the Macro side (or the lens is moved out away from a sensor plane, e.g.) for the reason that the probability is high that the image object is closer to the camera.

Alternative Cameras and Camera Components

A camera module in accordance with certain embodiments includes physical, electronic and/or optical architectures, including a movable lens or lens group, and a movable lens or lens group actuator, one or more fixed lenses and an image sensor within a camera module housing and/or is itself within an embedded device housing and electrically, mechanically and/or signal connected either directly and/or using certain wireless technology. Camera module embodiments and embodiments of features and components of camera modules that may be included with alternative embodiments are described at U.S. Pat. Nos. 7,224,056, 7,683,468, 7,936,062, 7,935,568, 7,927,070, 7,858,445, 7,807,508, 7,569,424, 7,449,779, 7,443,597, 7,768,574, 7,593,636, 7,566,853, 8,005,268, 8,014,662, 8,090,252, 8,004,780, 8,119,516, 7,920,163, 7,747,155, 7,368,695, 7,095,054, 6,888,168, 6,583,444, and 5,882,221, and US published patent applications nos. 2012/0063761, 2011/0317013, 2011/0255182, 2011/0274423, 2010/0053407, 2009/0212381, 2009/0023249, 2008/0296717, 2008/0099907, 2008/0099900, 2008/0029879, 2007/0190747, 2007/0190691, 2007/0145564, 2007/0138644, 2007/0096312, 2007/0096311, 2007/0096295, 2005/0095835, 2005/0087861, 2005/0085016, 2005/0082654, 2005/0082653, 2005/0067688, and U.S. patent application No. 61/609,293, and PCT applications nos. PCT/US12/24018 and PCT/US12/25758, which are all hereby incorporated by reference.

Components of MEMS actuators that may be included with a camera module that includes a movable optic or optical group in accordance with alternative embodiments are described at U.S. Pat. Nos. 7,972,070, 8,014,662, 8,090,252, 8,004,780, 7,747,155, 7,990,628, 7,660,056, 7,869,701, 7,844,172, 7,832,948, 7,729,601, 7,787,198, 7,515,362, 7,697,831, 7,663,817, 7,769,284, 7,545,591, 7,792,421, 7,693,408, 7,697,834, 7,359,131, 7,785,023, 7,702,226, 7,769,281, 7,697,829, 7,560,679, 7,565,070, 7,570,882, 7,838,322, 7,359,130, 7,345,827, 7,813,634, 7,555,210, 7,646,969, 7,403,344, 7,495,852, 7,729,603, 7,477,400, 7,583,006, 7,477,842, 7,663,289, 7,266,272, 7,113,688, 7,640,803, 6,934,087, 6,850,675, 6,661,962, 6,738,177 and 6,516,109; and at US published patent applications nos. 2010/030843, 2007/0052132, 2011/0317013, 2011/0255182, 2011/0274423, and at US unpublished patent application Ser. Nos. 13/302,310, 13/247,938, 13/247,925, 13/247,919, 13/247,906, 13/247,902, 13/247,898, 13/247,895, 13/247,888, 13/247,869, 13/247,847, 13/079,681, 13/008,254, 12/946,680, 12/946,670, 12/946,657, 12/946,646, 12/946,624, 12/946,614, 12/946,557, 12/946,543, 12/946,526, 12/946,515, 12/946,495, 12/946,466, 12/946,430, 12/946,396, 12/873,962, 12/848,804, 12/646,722, 12/273,851, 12/273,785, 11/735,803, 11/734,700, 11/848,996, 11/491,742, and at USPTO-Patent Cooperation Treaty applications nos. PCT/US12/24018, PCT/US11/59446, PCT/US11/59437, PCT/US11/59435, PCT/US11/59427, PCT/US11/59420, PCT/US11/59415, PCT/US11/59414, PCT/US11/59403, PCT/US11/59387, PCT/US11/59385, PCT/US10/36749, PCT/US07/84343, and PCT/US07/84301.

All references cited above and below herein are incorporated by reference, as well as the background, abstract and brief description of the drawings, and U.S. application Ser. Nos. 12/213,472, 12/225,591, 12/289,339, 12/774,486, 13/026,936, 13/026,937, 13/036,938, 13/027,175, 13/027,203, 13/027,219, 13/051,233, 13/163,648, 13/264,251, and PCT published application WO2007/110097, and U.S. Pat. Nos. 6,873,358, and RE42,898 are each incorporated by reference into the detailed description of the embodiments as disclosing alternative embodiments.

The following are also incorporated by reference as disclosing alternative embodiments:

U.S. Pat. Nos. 8,055,029, 7,855,737, 7,995,804, 7,970,182, 7,916,897, 8,081,254, 7,620,218, 7,995,855, 7,551,800, 7,515,740, 7,460,695, 7,965,875, 7,403,643, 7,916,971, 7,773,118, 8,055,067, 7,844,076, 7,315,631, 7,792,335, 7,680,342, 7,692,696, 7,599,577, 7,606,417, 7,747,596, 7,506,057, 7,685,341, 7,694,048, 7,715,597, 7,565,030, 7,636,486, 7,639,888, 7,536,036, 7,738,015, 7,590,305, 7,352,394, 7,564,994, 7,315,658, 7,630,006, 7,440,593, and 7,317,815, and U.S. patent application Ser. Nos. 13/306,568, 13/282,458, 13/234,149, 13/234,146, 13/234,139, 13/220,612, 13/084,340, 13/078,971, 13/077,936, 13/077,891, 13/035,907, 13/028,203, 13/020,805, 12/959,320, 12/944,701 and 12/944,662, and United States published patent applications serial nos. US20120019614, US20120019613, US20120008002, US20110216156, US20110205381, US20120007942, US20110141227, US20110002506, US20110102553, US20100329582, US20110007174, US20100321537, US20110141226, US20100141787, US20110081052, US20100066822, US20100026831, US20090303343, US20090238419, US20100272363, US20090189998, US20090189997, US20090190803, US20090179999, US20090167893, US20090179998, US20080309769, US20080266419, US20080220750, US20080219517, US20090196466, US20090123063, US20080112599, US20090080713, US20090080797, US20090080796, US20080219581, US20090115915, US20080309770, US20070296833 and US20070269108.

While an exemplary drawing and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention, as set forth in the claims below and structural and functional equivalents thereof.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, unless expressly set forth or understood by those skilled in the art being necessary.

What is claimed is:

1. A camera module, comprising:
a camera module housing defining an aperture and an internal cavity to accommodate camera module components;
an image sensor coupled to or within the housing;
a lens barrel within the housing that contains an optical train disposed relative to the aperture and image sensor to focus images of scenes onto the image sensor along an optical path;
an actuator coupled to one or more lenses of the optical train and configured to move the one or more lenses relative to the image sensor to provide zoom or autofocus or both; and
a processor, wherein the processor is configured to control the actuator to:
bias one or more pairs of actuator components,
measure one or more capacitances of the one or more pairs of actuator components,
determine an orientation of the camera module based on the one or more measured capacitances, and
provide information accordingly for and/or control the actuator to step through an auto-focus process that is specifically tailored to one of multiple sub-ranges of camera pointing angles that corresponds to the determined orientation of the camera module, wherein:
the provided information is compared with calibration values for selecting a specific subset, among multiple subsets, of auto-focus steps that is tailored to a specific orientation range of camera pointing angles of the camera module, and
the specific orientation range comprises one of at least three divided sub-ranges of camera pointing angles of 60 degrees or less within an overall 180 degree range between pointing straight up and pointing straight down.

2. The camera module of claim 1, wherein the information provided according to the one or more measured capacitances is also used by the processor to calculate one or more values used to align the optical train along the optical path with respect to tilt alignment.

3. The camera module of claim 1, wherein the information provided according to the one or more measured capacitances is also used by the processor to calculate one or more values used to align the optical train along the optical path with respect to centering alignment.

4. The camera module of claim 1, wherein the one or more pairs of actuator components comprise at least two pairs of components.

5. The camera module of claim 1, wherein the one or more pairs of actuator components comprise at least three pairs of components.

6. The camera module of claim 1, wherein the actuator is configured to facilitate optical image stabilization.

7. A camera-enabled mobile device comprising the camera module of claim 1.

8. A method for using the camera module of claim 1, the method comprising:
   determining the orientation of the camera module; and
   selecting the specific subset of auto-focus steps that is tailored to the specific range.

9. The camera module of claim 1, wherein the specific orientation range comprises one of five 36 degree sub-ranges and the actuator is electrostatically actuated.

10. The camera module of claim 1, wherein the optical train comprises a single movable lens coupled to said actuator and one or more further lenses that are fixed relative to the image sensor.

11. A camera-enabled mobile device, comprising:
   a mobile device housing defining an aperture and an internal cavity to accommodate camera module components and embedded mobile device components;
   a display;
   a user interface; and
   a processor coupled to or within the housing and coupled to the display and the user interface, wherein the camera module components comprise:
   an image sensor coupled to or within the housing;
   a lens barrel within the housing that contains an optical train disposed relative to the aperture and image sensor to focus images of scenes onto the image sensor along an optical path; and
   an actuator coupled to one or more lenses of the optical train and configured to move the one or more lenses relative to the image sensor to provide zoom or autofocus or both, wherein the processor is configured to control the actuator to:
   bias one or more pairs of actuator components,
   measure one or more capacitances of the one or more pairs of actuator components,
   determine an orientation of the camera module based on the one or more measured capacitances, and
   provide information accordingly for and/or control the actuator to step through an auto-focus process that is specifically tailored to one of multiple sub-ranges of camera pointing angles that corresponds to the determined orientation of the camera module, wherein:
   the provided information is compared with calibration values for selecting a specific subset, among multiple subsets, of auto-focus steps that is tailored to a specific orientation range of camera pointing angles of the camera module, and
   the specific orientation range comprises one of at least three divided sub-ranges of camera pointing angles of 60 degrees or less within an overall 180 degree range between pointing straight up and pointing straight down.

12. The mobile device of claim 11, wherein the information provided according to the one or more measured capacitances is also used by the processor to calculate one or more values used to align the optical train along the optical path with respect to tilt alignment.

13. The mobile device of claim 11, wherein the information provided according to the one or more measured capacitances is also used by the processor to calculate one or more values used to align the optical train along the optical path with respect to centering alignment.

14. The mobile device of claim 11, wherein the one or more pairs of actuator components comprise at least two pairs of components.

15. The mobile device of claim 11, wherein the one or more pairs of actuator components comprise at least three pairs of components.

16. The mobile device of claim 11, wherein the actuator is configured to facilitate optical image stabilization.

17. The mobile device of claim 11, wherein the processor is coupled to the actuator using a flexible printed circuit.

18. The mobile device of claim 11, wherein the actuator is electrostatically actuated.

19. The mobile device of claim 11, wherein the specific orientation range comprises one of five 36 degree sub-ranges.

20. The mobile device of claim 11, wherein the optical train comprises a single movable lens coupled to said actuator and one or more further lenses that are fixed relative to the image sensor.

* * * * *